(12) United States Patent
Bager et al.

(10) Patent No.: US 12,546,289 B2
(45) Date of Patent: Feb. 10, 2026

(54) TRANSMISSION FOR A WIND TURBINE

(71) Applicant: Vestas Wind Systems A/S, Aarhus N. (DK)

(72) Inventors: Christian Bager, Herne (DE); Tim Niklas Schröder, Dortmund (DE); Heiko Schreiber, Doberschau (DE)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/851,147

(22) PCT Filed: Mar. 21, 2023

(86) PCT No.: PCT/DK2023/050047
§ 371 (c)(1),
(2) Date: Sep. 26, 2024

(87) PCT Pub. No.: WO2023/186224
PCT Pub. Date: Oct. 5, 2023

(65) Prior Publication Data
US 2025/0223946 A1 Jul. 10, 2025

(30) Foreign Application Priority Data
Mar. 29, 2022 (EP) .................................. 22165247

(51) Int. Cl.
*F16H 25/06* (2006.01)
*F03D 15/10* (2016.01)
(Continued)

(52) U.S. Cl.
CPC ............ *F03D 15/10* (2016.05); *F03D 80/707* (2023.08); *F16H 1/32* (2013.01); *F16H 57/043* (2013.01);
(Continued)

(58) Field of Classification Search
CPC .......... F03D 15/00; F03D 15/10; F16H 25/06; F16H 57/0431; F16H 57/0434
See application file for complete search history.

(56) References Cited

U.S. PATENT DOCUMENTS

| 3,595,100 A * | 7/1971 | Stark ..................... F16H 57/043 |
| | | 184/6.12 |
| 2011/0031829 A1* | 2/2011 | Bayer ..................... H02K 7/116 |
| | | 310/83 |
| 2013/0043683 A1* | 2/2013 | Genovese ............. F16H 49/001 |
| | | 290/54 |

FOREIGN PATENT DOCUMENTS

| DE | 102016209654 A1 * | 12/2017 | ................ F16C 3/02 |
| RU | 2165552 C2 | 4/2001 | |

OTHER PUBLICATIONS

International Searching Authority, International Search Report and Written Opinion issued in corresponding PCT Application No. PCT/DK2023/050047, dated Jun. 12, 2023 (13 pages).
(Continued)

*Primary Examiner* — Justin D Seabe
(74) *Attorney, Agent, or Firm* — Wood Herron & Evans LLP

(57) ABSTRACT

A transmission which may find particular utility in wind turbine application, but may also be used in other applications. The transmission comprises a fixed gear ring, a first drive member rotationally supported within the fixed gear ring, the first drive member defining a plurality of radially arranged apertures or bores, each of which accommodates a tooth element. The tooth elements have a tooth tip and a tooth base, and the first drive member further comprises a radially outer face and a radially inner face, and wherein the tooth tips of the tooth elements engage a corresponding gear profile defined by the fixed gear ring. A second drive member is rotationally supported such that it extends within
(Continued)

the first drive member, and defines a cam profile which engages the tooth base of each of the plurality of tooth elements. The first drive member further comprises a lubrication system configured to feed lubrication fluid to at least one of i) the radially arranged apertures, ii) the radially outer face of the first drive member and iii) the radially inner face of the first drive member. Beneficially, the invention involves targeting specific points on and in the first drive member for lubrication by defining the lubrication passages inside the first drive member. Structuring the first drive member in this way provides a convenient and mechanically elegant way of feeding lubrication oil directly to the parts that need it most.

15 Claims, 16 Drawing Sheets

(51) Int. Cl.
    *F03D 80/70*     (2016.01)
    *F16H 1/32*     (2006.01)
    *F16H 57/04*     (2010.01)

(52) U.S. Cl.
    CPC ..... *F16H 57/0434* (2013.01); *F16H 57/0486* (2013.01); *F05B 2260/4031* (2013.01); *F05B 2260/98* (2013.01)

(56) References Cited

OTHER PUBLICATIONS

European Patent Office, Extened European Search Report issued in corresponding EP Application No. 22165247.2-1012, dated Sep. 14, 2022 (7 pages).

* cited by examiner

TRANSMISSION FOR A WIND TURBINE

TECHNICAL FIELD

The present invention relates to a transmission in a powertrain assembly, particularly for a wind turbine.

BACKGROUND TO THE INVENTION

Wind turbines convert kinetic energy from the wind into electrical energy, using a large rotor with a number of rotor blades. A typical Horizontal Axis Wind Turbine (HAWT) comprises a tower, a nacelle on top of the tower, a rotor hub mounted to the nacelle and a plurality of wind turbine rotor blades coupled to the rotor hub. Depending on the direction of the wind, the nacelle and rotor blades are turned and directed into an optimal direction by a yaw system for rotating the nacelle and a pitch system for rotating the blades.

The nacelle houses many functional components of the wind turbine, including for example a main rotor shaft and one or more electrical generator, as well as convertor equipment for converting the mechanical energy at the rotor into electrical energy for provision to the grid. In some types of wind turbines, known as 'direct drive' systems, the main rotor shaft drives the electrical generator directly. However, it is more common for wind turbines to include a gearbox to step up the rotational speed between the main rotor shaft and the electrical generator, thus converting the low speed but high torque input from the main rotor shaft to a lower torque but higher speed input into the electrical generator. Together, the main rotor shaft, gearbox and generator constitute a power train of the wind turbine.

Typically, gearboxes for wind turbines include parallel gearboxes, epicyclic gearboxes, or a combination of both designs, and provide gear ratios between 1:30 and 1:140. Such high gear ratios usually require more than one gear stage which increases the size of the gearbox, and also its overall mass and cost. The mass of the gearbox contributes significantly to the overall mass of the nacelle, so it is desirable to reduce this mass to reduce the pendulum effect of the nacelle mass on top of the wind turbine tower which may reach over 100 m in height, and even up to and over 160 m in height.

Gear system designs with more compact layouts are known. One such gear system is known as a strain wave drive system or 'harmonic drive', and is well-known in small scale applications such as robotic joints and wheel motors. However, such systems are used as speed reducers and are generally not considered compatible as speed increasers due to issues with torque loading.

Another type of compact gear system is disclosed in U.S. Pat. No. 8,656,809B2 and U.S. Pat. No. 8,256,327B2, to Wittenstein Group. Such a gear system includes a speed reducer arrangement that features a plurality of circumferentially arranged teeth each of which is configured to move radially in a tooth carrier member. The bases of the teeth are driven by a rotatable cam member which constitutes an input drive, whilst the tips of the teeth engage on an outer ring with an inner tooth profile. The number of radially or slidably movable teeth differ from the number of teeth shapes in the ring tooth profile which causes the tooth carrier member to move at a slower rate than the input drive member. The tooth carrier member therefore constitutes an output drive member. Such 'radial-moving-teeth' gearbox designs are able to achieve a high-speed reduction ratio between 1:10 and 1:200.

Gear systems based on radial-moving-teeth designs generally are not reverse driven largely due to reduced efficiency when operated in the reverse driven direction. There are various technical challenges associated with configuring a radial-moving tooth design gearbox to be used as a speed increasing transmission, particularly in high torque applications, at least some of which the invention discussed herein is directed to address.

SUMMARY OF THE INVENTION

According to a first aspect of the invention, there is provided a transmission which may find particular utility in wind turbine application, but may also be used in other applications. The transmission comprises a fixed gear ring, a first drive member rotationally supported within the fixed gear ring, the first drive member defining a plurality of radially arranged apertures or bores, each of which accommodates a tooth element, configured to slide or move within the respective aperture. The tooth elements have a tooth tip and a tooth base, and the first drive member further comprises a radially outer face and a radially inner face, and wherein the tooth tips of the tooth elements engage a corresponding tooth surface defined by the fixed gear ring. A second drive member is rotationally supported such that it extends within the first drive member, and defines a cam profile which engages, directly or indirectly e.g. by way of an intermediate element such as a pivot pad, the tooth base of each of the plurality of tooth elements. The first drive member further comprises a lubrication system/network configured to feed lubrication fluid to at least one of i) the radially arranged apertures, ii) the radially outer face of the input member and iii) the radially inner face of the first drive member.

In the examples of the invention the lubrication system includes one or more fluid lubrication passages, drillings or channels that extends internally through the material that makes up the first drive member. Beneficially, the invention involves targeting specific points on and in the first drive member for lubrication by defining the lubrication passages inside the first drive member. Structuring the first drive member in this way provides a convenient and mechanically elegant way of feeding lubrication oil directly to the parts that need it most.

In one example, the transmission may form part of a speed increasing gearbox where rotation of the first drive member causes radial movement of the tooth elements by engagement with the fixed ring gear.

In another aspect, the examples of the invention provide a wind turbine including a tower on which is mounted a nacelle that supports a rotatable hub, wherein the rotatable hub is coupled to a transmission as defined above.

Preferred and/or optional features of the invention are set out in the appended claims.

BRIEF DESCRIPTION OF THE DRAWINGS

The present invention will now be described, by way of example only, with reference to the attached drawings, in which.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put into effect without the specific details and that in some instances, well known methods, techniques and structures have not been described in detail in order not to obscure the invention unnecessarily.

Figure 1:
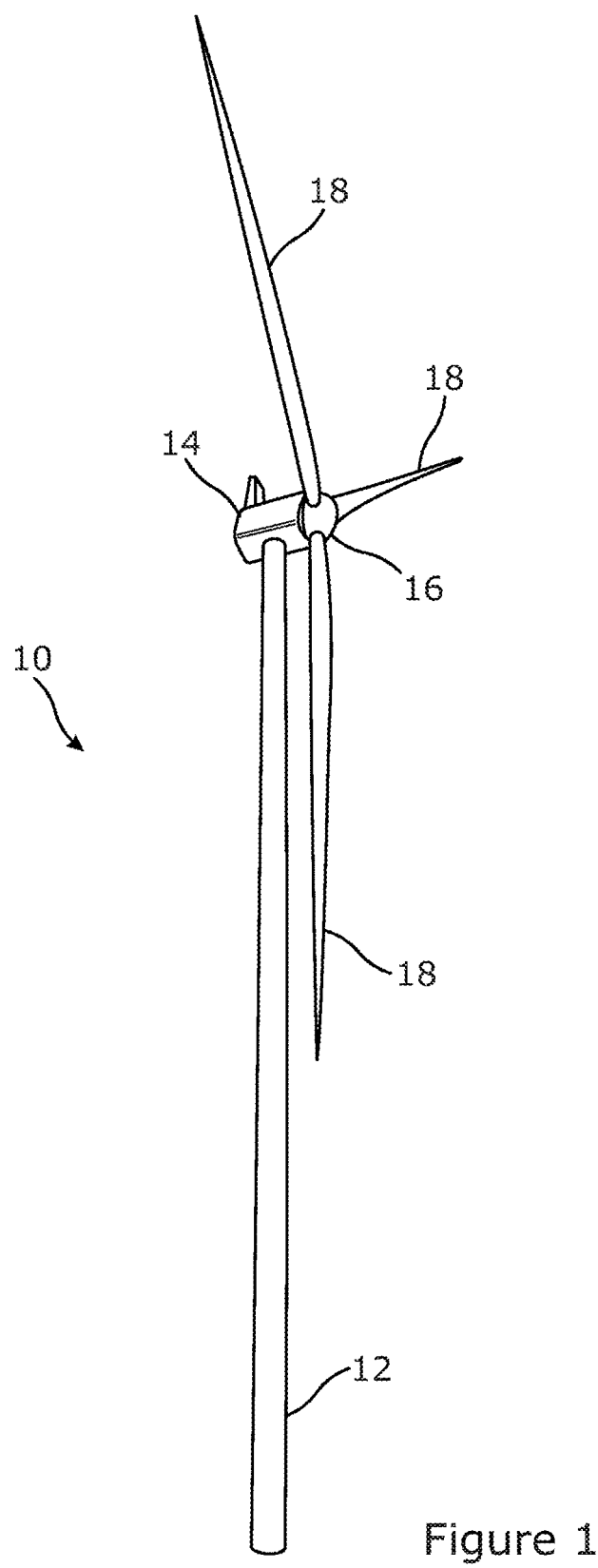
FIG. 1 is a perspective view of a horizontal-axis wind turbine within which the invention may be incorporated.

In order to place the embodiments of the invention in a suitable context, reference will firstly be made to FIG. 1, which illustrates a typical Horizontal Axis Wind Turbine (HAWT) in which a generator rotor assembly according to an embodiment of the invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 10 comprises a tower 12, a nacelle 14 rotatably coupled to the top of the tower 12 by a yaw system (not shown), a rotor hub 16 mounted to the nacelle 14 and a plurality of wind turbine rotor blades 18 coupled to the rotor hub 16. The nacelle 14 and rotor blades 18 are turned and directed into the wind direction by the yaw system.

Figure 2:
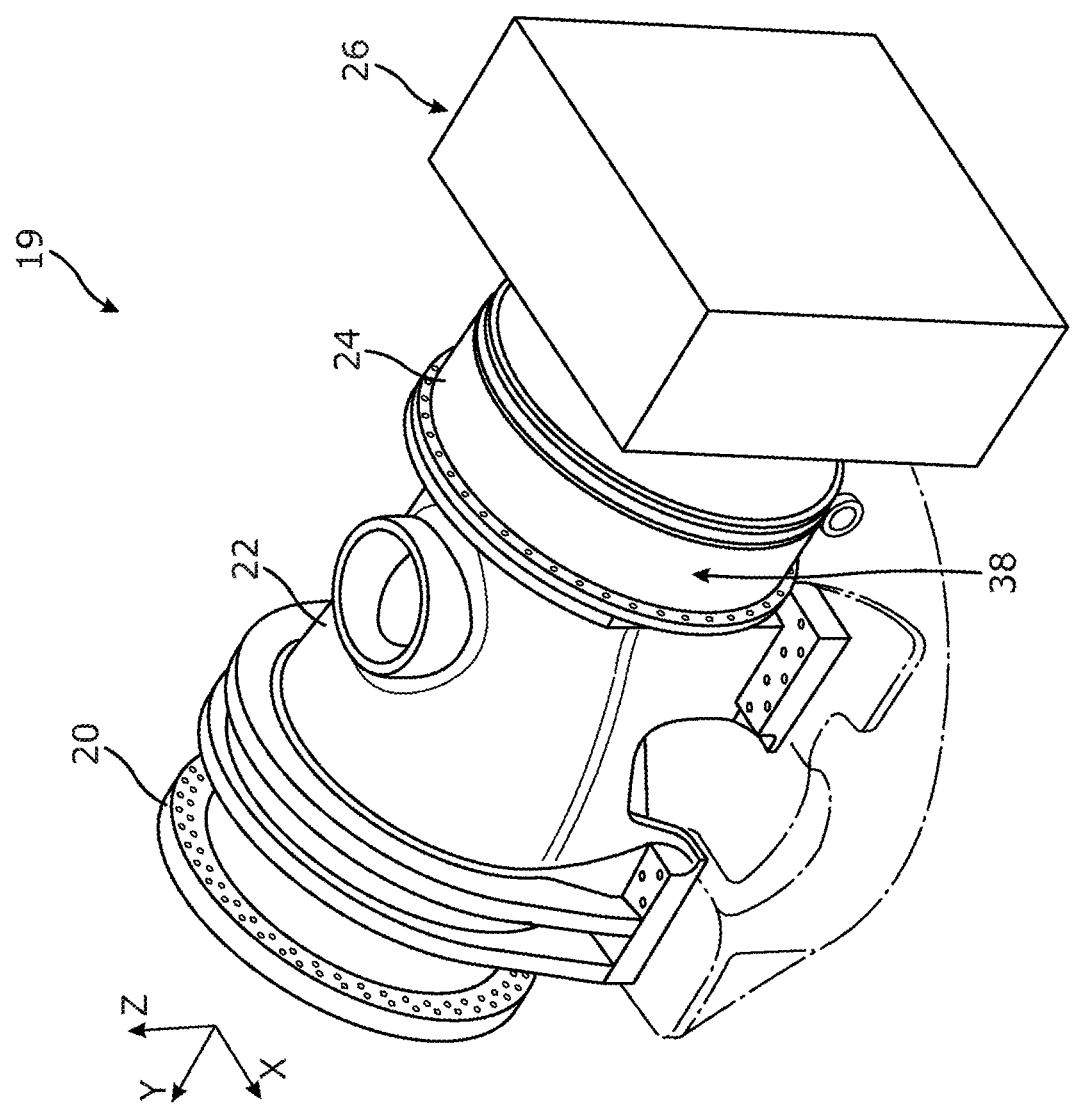
FIG. 2 is a perspective view of a power transmission system for the wind turbine in FIG. 1, which includes a main shaft, a gearbox or transmission, and an electrical generator.

The nacelle 14 houses many functional components of the wind turbine, including the main rotor shaft, generator, gearbox, and power converter for converting the mechanical energy of the wind into electrical energy for provision to the grid. Together, these components are generally referred to as the powertrain of the wind turbine, whereas the gearbox and generator are generally referred to as the drivetrain. FIG. 2 illustrates an example of a layout of part of a powertrain 19 within the nacelle 14, that layout including a main shaft 20, which extends through a main bearing housing 22, a gearbox 24 and a generator 26. The main shaft 20 is connected to, and driven by, the rotor hub 16 and provides input drive to the gearbox 24.

The gearbox 24 steps up the rotational speed of the low-speed main shaft via internal gears (not shown) and drives a gearbox output shaft (also not shown). The gearbox output shaft in turn drives the generator 26, which converts the rotation of the gearbox output shaft into electricity. The electricity generated by the generator 26 may then be converted by other components (not shown) as required before being supplied to an appropriate consumer, for example an electrical grid distribution system.

Figure 3:
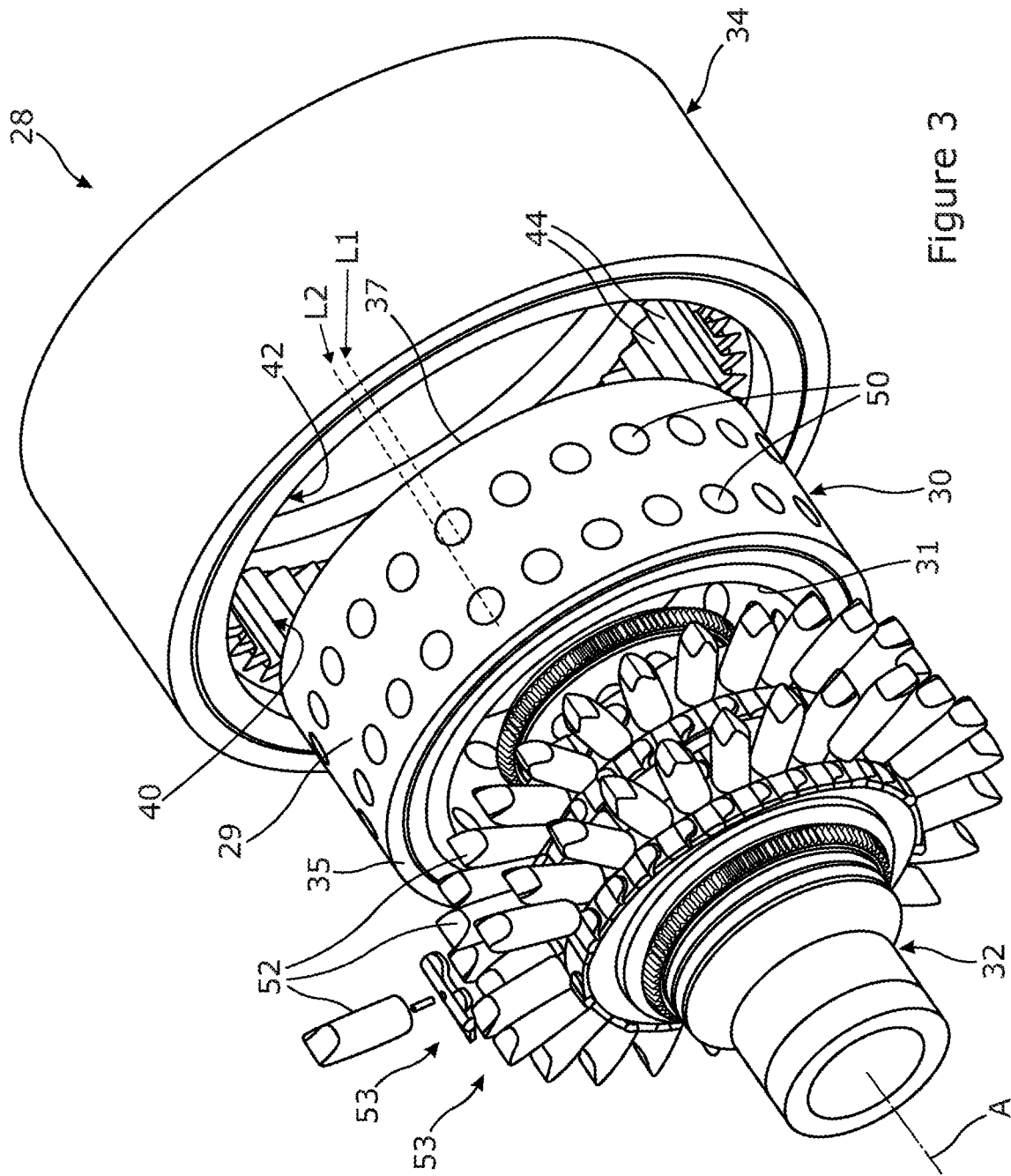
FIG. 3 is an exploded perspective view of the transmission of the system shown in FIG. 2.
Figure 4:
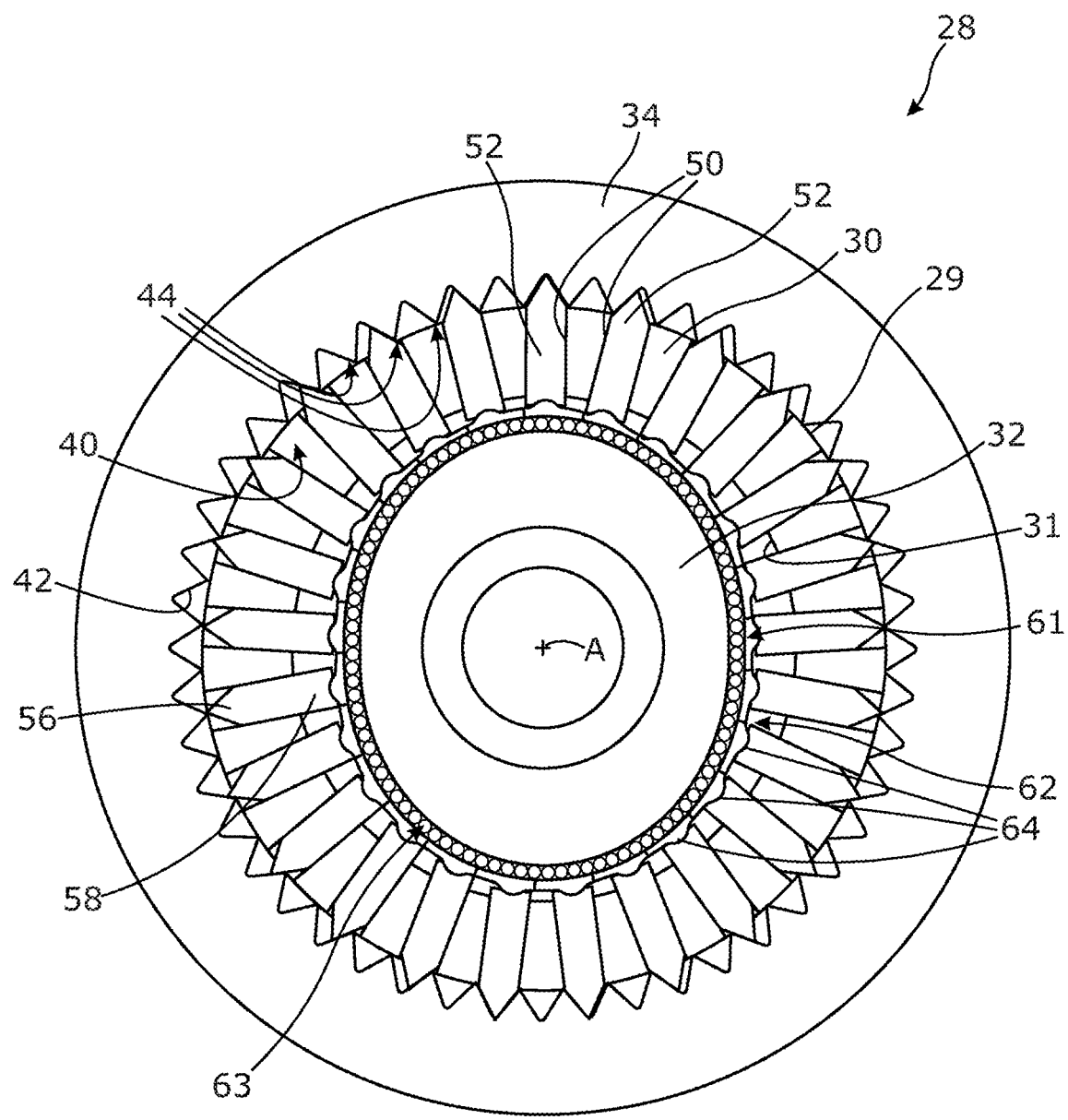
FIG. 4 is a view transversely through the transmission showing the arrangement of main components.

Aspects of the gearbox are shown in more detail in FIG. 3 and FIG. 4. FIG. 3 illustrates the general arrangement of various components of the gearbox 24, as an exploded view, whilst FIG. 4 shows the relative positioning of the internal components of the gearbox. Hereinafter, the gearbox components will be referred to generally as a transmission 28.

The transmission 28 comprises three main components: an input drive member 30, or 'tooth carrier', an output drive member 32, and an outer gear ring 34. The transmission 28 is configured to increase the speed of rotation between the input drive member 30 and the output drive member 32. In this context, the input drive member 30 would be coupled to the main rotor shaft 20 of the wind turbine, and the output drive member 32 would be coupled to a rotor of the electrical generator 26. The main components of the transmission as discussed above may be made of a suitable material, for example a suitable grade of cast or forged steel. In lower load applications, the components may be made from other materials such as suitable engineering plastics. The selection of the exact material for a particular application would be within the abilities of a skilled person.

At this point it should be noted that the general arrangement of the transmission is similar to the so-called "Galaxie"® drive system manufactured by Wittenstein Group. This type of system is sometimes referred to in the art as a 'radial-moving-tooth' or 'slidable tooth' design, and fundamentals of the technology are described in U.S. Pat. No. 8,656,809B2 and U.S. Pat. No. 8,256,327B2, amongst others. However, such drive systems tend to be used in speed reduction applications with lighter loading and with relatively short working lives, whereas in the current context the intention is for the transmission to be used in high loading applications as a speed increaser to convert the relatively high torque and low speed input drive from the main rotor of the wind turbine (approx. 5-15 rpm) to a lower torque but higher speed output drive for the gearbox (approximately 100-1000 rpm). Moreover, in wind turbine applications, gearboxes tend to be in operation for longer time periods compared to other applications, for example usually wind turbines have a working life of 25 years.

Returning to FIGS. 3 and 4, the outer gear ring 34 is a rotationally fixed component which is associated with or formed as part of a main housing 38 (see in FIG. 2) of the gearbox 24. Therefore, the outer gear ring 34 is in a rotationally fixed relation to the nacelle of the wind turbine.

The outer gear ring 34 is configured to define an internal gear profile 40 about its radial interior surface 42. The gear profile 40 extends circumferentially about the rotational axis of the transmission. The gear profile 40 is defined by a plurality of gear tooth sections 44 or more simply 'gear sections'.

It should be noted that the outer profile of each gear section 44 is shaped to define part of a logarithmic profile, which is a benefit in terms of force transmission with tooth members of the transmission, as will now be discussed. The precise tooth geometry is not the focus of the invention, however, and so further discussion will be omitted for clarity.

The input member 30 is configured to rotate within the space defined by the outer gear ring 34. Similarly, the output member 32 is rotationally supported such that it extends within or through the input member so it is able to rotate therein.

The input member 30 is associated with and is physically connected to the main shaft of the wind turbine and so rotates at the same speed. It should be appreciated that the input member 30 is not shown connected to the main shaft in the drawings. However, the input member 30 comprises a set of bolt holes on its axial surface which serve to define a connecting interface for the main shaft, or to an intermediate coupling member to couple the input member 30 to the main shaft. It should be noted that the input member 30 could also be connected to the main shaft by way of a press fit connection such as a shrink disk.

The input member 30 is annular in form and defines a radially outer facing surface 29, a radially inward facing surface 31, and first and second axial facing surfaces, 35,37. The input member 30 is configured to define a circumferentially-spaced arrangement of apertures, bores or holes 50, each of which accommodates a respective gear tooth element 52. The apertures 50 therefore act as guides for the respective tooth elements 52 and so may be considered as guide bores. The radial depth/dimension of the apertures 50 are less than the axial length of the gear tooth element so that the tips of the gear tooth elements protrude from the top surface of the input member 30. It should be noted that only two of the gear tooth elements 52 and respective apertures 50 are labelled in FIG. 4 so as not to obscure detail in the Figure. The precise number of gear tooth elements 52 and respective apertures 50 is not the subject of this invention and so will not be described in detail here. However, the number may vary between about 20 and 200. Moreover, the number of gear tooth elements and gear sections may be selected to vary the gear ratio between the input member 30 and the output member 32, and also to select the relative direction of rotation between the input member 30 and the output member 32.

As is known generally in the art, the input member 30 and the output member 32 may rotate in the same direction, albeit at different rotational speeds, or they may rotate in opposite directions, and the direction of rotation is determined by the relative number of gear tooth elements 52 in the input member 30 and the number of gear sections 44 in the outer gear ring 34. Reference is made to U.S. Ser. No. 10/830,328 which discusses more details relating to the interrelation between the number of gear sections 44 and the number of slidable tooth elements 52.

The input member 30 may be configured to have a single row of apertures 50 and gear tooth elements 52. However, in the illustrated example the input member 30 has two rows 53 of apertures 50 and gear tooth elements 52, spaced appropriately along the axial direction of the transmission. Further rows are possible, although not currently envisaged. In this context, the discussion above about the numbers of teeth in a row, would apply to each row. Note that the rotational axis of the transmission is indicated in FIGS. 3 and 4 as 'A'. This axis preferably coincides with the axis Y in FIG. 2.

As shown in FIG. 3, each row of apertures 50 is spaced circumferentially about the input member 30 in an angularly equi-spaced relationship. The angular interval between apertures 50 in the rows is the same for each row in the illustrated embodiment, and may be between 2 and 20 degrees, for example, depending on the number of tooth elements. However, in theory there may be different numbers of apertures 50, and therefore tooth elements 52, in each row. In the illustrated example, where there are equal numbers of apertures 50 and tooth elements 52 in the rows, the apertures 50 in one row are angularly shifted from the apertures 50 in the other one of the rows. This can be appreciated by observing the line L1 which is taken through the centre of one of the apertures 50 in one of the rows, and line L2 which is taken through the centre of the nearest aperture 50 in the other row. As can be seen, there is a small angular shift between the apertures 50 in the two rows. The angular shift may be up to 50% of the angular interval between adjacent apertures 50. For example, the angular shift may be 5% or 10% or 20% or 30% or 40% of the angular interval between a neighbouring two apertures 50 in a particular row. For example, for a row with 30 apertures, the angular interval would be 12 degrees. The angular shift between apertures in adjacent rows may therefore be up to 6 degrees.

The rotating action of the input member 30 causes the respective gear tooth elements 52 to be driven radially inwardly by the gear profile 40 since they are slidable within the apertures 50. Since the number of gear tooth elements 52 does not match the number of gear sections 44 of the gear profile 40, the result is that each of the gear tooth elements 52 is at a different radial lift height within its respective aperture 50. This imparts a wave-like pattern of motion of the gear tooth elements 52 which in turn imparts a rotational drive force to the output member 32, as will now be described.

Figure 5A:
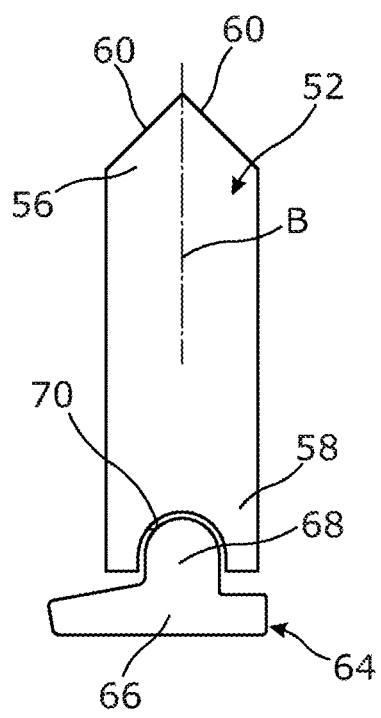
FIGS. 5a-c are a series of views showing a gear tooth element of the transmission and an associated pivot/tilt pad.
Figure 5B:
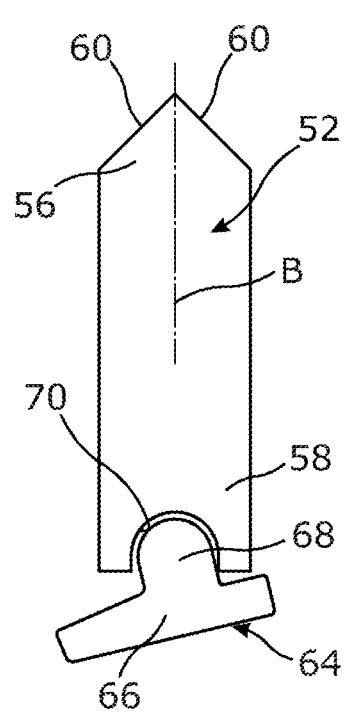
Figure 5C:
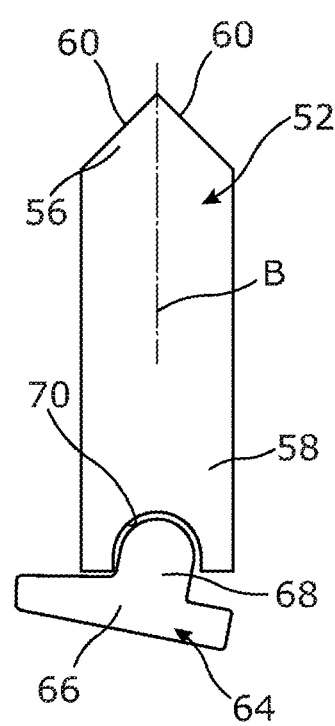

Referring to the gear tooth elements 52 in more detail, and also with reference to FIGS. 5a-c, it will be seen that each gear tooth element 52 includes a tooth tip region 56 and a tooth base region 58, both of which are aligned on a tooth axis B. The tooth tip region 56 is positioned radially outwardly with respect to the tooth base region 58. Although not seen clearly in FIGS. 3 and 4, it should be appreciated that the shape of the tooth tip region 56 is configured to compliment the shape of the respective gear section 44 of the outer ring gear 34. Each flank 60 of a tooth tip region 56 may be shaped to define a substantially flat surface, in the illustrated example, although in other examples the flanks may define a part of a logarithmic spiral or have some degree of curvature.

Whereas the tooth tip regions 56 of the gear tooth elements 52 engage with the gear profile 40 of the outer ring member 34, the tooth base regions 58 of the gear tooth elements 52 engage with the output member 32.

As can be seen in FIG. 4 particularly well, the output member 32 has a non-circular shaped circumferential outer surface 61. More specifically the shape is oval in the illustrated example. The output member 32 is therefore cam-shaped in form so as to provide a shaft cam drive with two cam peaks, in this example. Other examples may provide a single cam peak or more than two cam peaks. It is the shape of the output drive member 32 that allows the gear tooth elements 52 to drive it with a rotational motion.

In order to reduce friction between the gear tooth elements 52 and the output drive member 32, there is provided a bearing arrangement 62.

The bearing arrangement 62 comprises a plurality of pivot pads 64, only some of which are labelled in FIG. 4. Each of the pivot pads 64 is associated with a respective one of the gear tooth elements 52 and acts as a fulcrum against which bears a respective base region 58 of a gear tooth element 52. The gear tooth elements 52 therefore engage the cam surface of the output member 52 to transmit a force thereto thereby acting on and driving the output member. However, the tooth element 52 act on the cam surface indirectly in this example by bearing against the pivot pads 64, although the term 'engage', 'act on' and 'driven by' in this context are considers to cover both direct engagement and also indirect engagement via the pivot pads or other functionally equivalent bearing type element.

The action of a pivot pad 64 is shown schematically in FIGS. 5a-c. As can be seen the pivot pad 64 includes a pad portion 66 and a pivot or fulcrum portion 68. The pivot portion 68 protrudes upwardly from the pad portion 66 and is shaped to complement a recess 70 defined in the underside of the base region 58 of the gear tooth element 52. The pivot portion 68 may define a part-spherical or part-cylindrical protrusion. The precise geometry is not crucial to the Invention but it should allow the pivot pad 64 to pivot smoothly with respect to the gear tooth element 52, as can be seen in the Figures, in which FIG. 5a shows the pivot pad 64 in a neutral position, and FIGS. 5b and 5c show the pivot pad 64 tilted to the left and to the right, respectively.

The pivot pads 64 are arranged to extend about the circumferential outer surface of the output member 32. Each pivot pad 64 is associated with a respective gear tooth element 52. Since the pivot pads 64 slide on the outer surface of the output member 32, a suitable means may preferably be provided to aid lubrication between those components. This may be fulfilled by a low friction coating on the underside of the pivot pads 64 and/or a low friction coating on the outer surface of the output member 32. Alternatively, the pivot pads 64 may be mounted on a suitable sliding bearing or roller bearing train 63 (c.f. FIG. 4), for example. The pivot pads 64 may be suitably coupled to one other. To constrain the pivot pads from moving about on the output drive member 32 in the axial direction, the pivot pads 64 may be received in a shallow guide channel (not shown) defined in the outer surface of the output member 32, or other functionally similar arrangement.

The benefit of the pivot pads is that they transmit the linear driving force vectors generated by the individual tooth elements more effectively into the cam-like surface of the output member 32 as that surface undulates beneath the pivot pad 64.

Figure 6A:
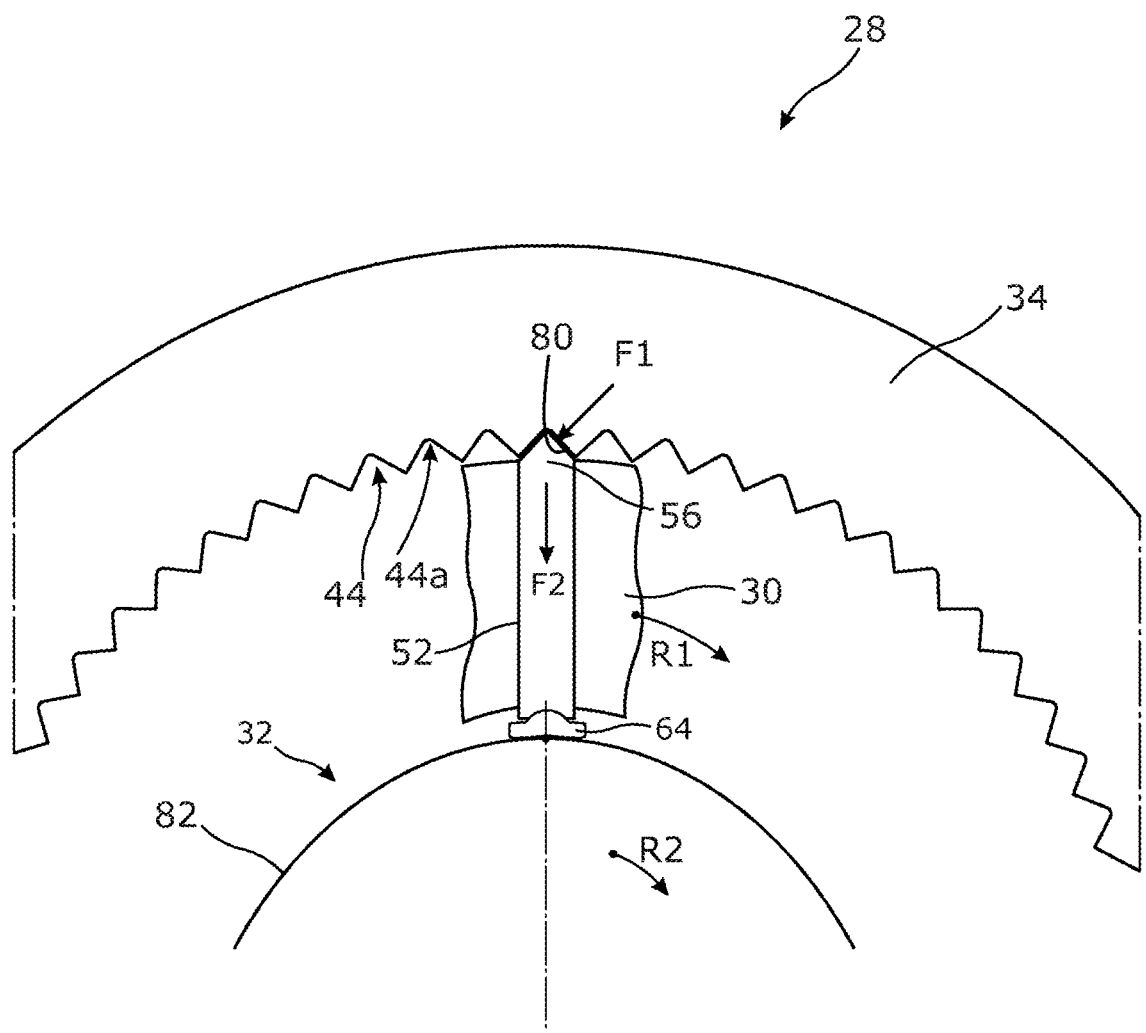
FIGS. 6a-c are a series of views that show the progress of one of the gear tooth elements of the transmission during a load cycle.
Figure 6B:
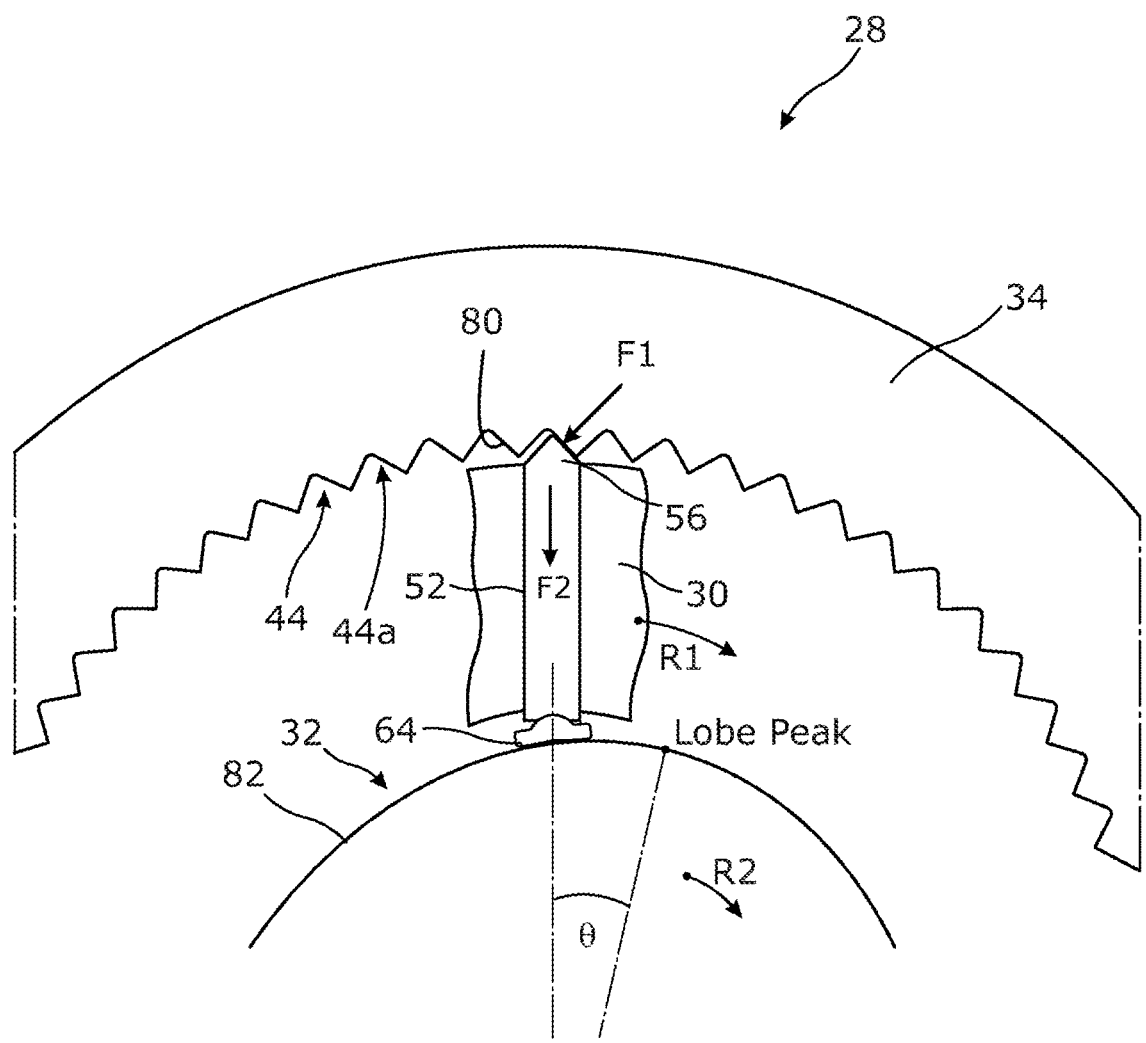
Figure 6C:
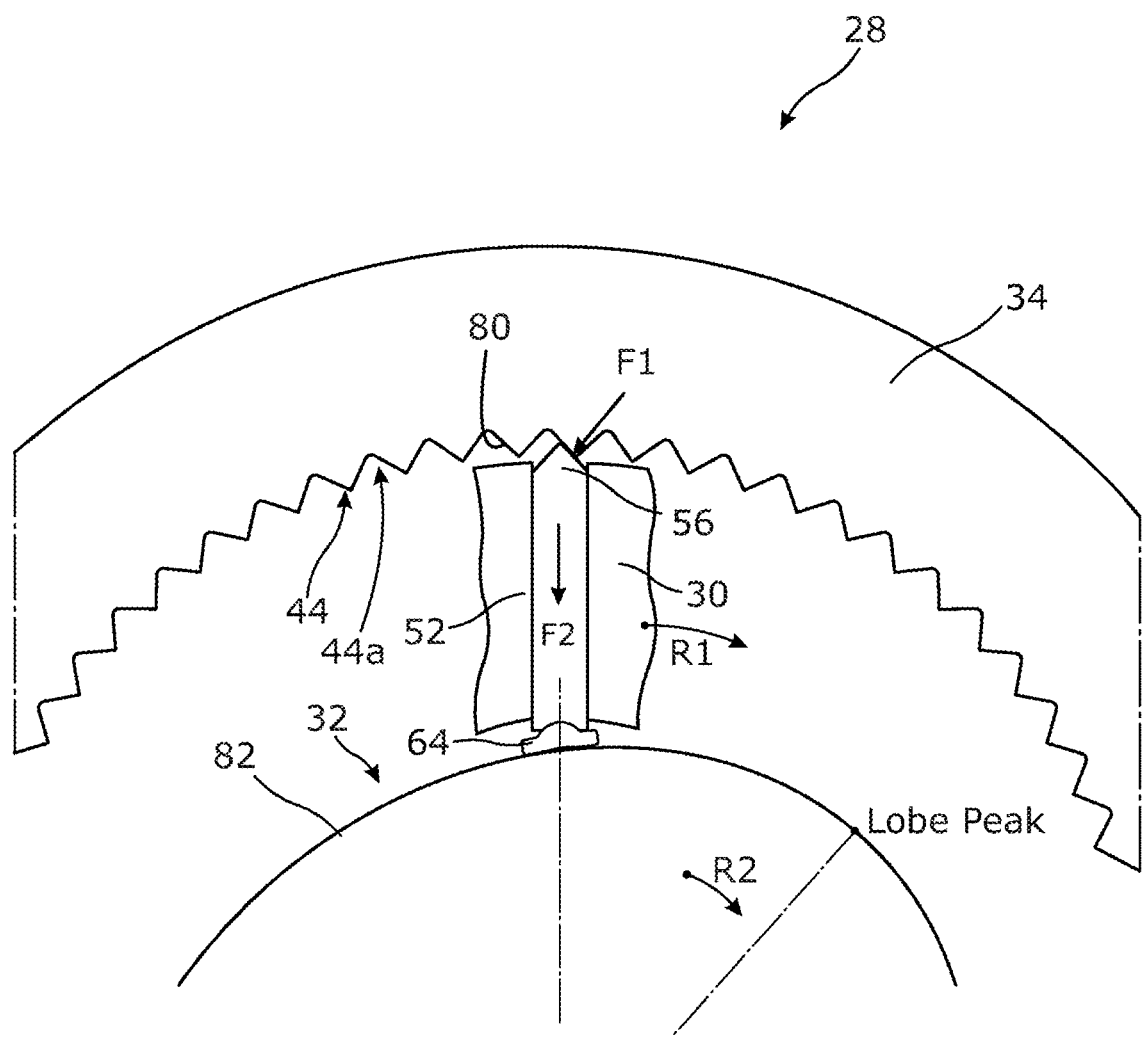

By way of further explanation, FIGS. 6a to 6c are a sequence of drawings that illustrates a short rotational phase of the input member 30 and the output member 32. In these Figures, only a single one of the gear tooth elements 52 are shown for the sake of clarity. However, from viewing FIGS. 6a to 6c, the relative movement of the input member 30 and the gear tooth element 52 is apparent, as is the effect that the force applied to the gear tooth element 52 has on the output member 32.

Referring firstly to FIG. 6a, this can be considered a reference position at the start of a tooth loading cycle where the tip region 56 of the gear tooth element 52 is located in a trough 44a of a gear tooth section 44. It should be noted that the outer ring gear 34 is stationary, whilst the input member 30 and the output member 32 rotate relative to it, but at different rotational speeds. The direction of rotation of the input drive member 30 is labelled as R1 in FIG. 6a, and can be seen as being clockwise in this example. Similarly, the direction of rotation of the output member 32 is labelled as R2, and is also clockwise, in this example. As noted above, the input and output members 30,32 may be configured to rotate in opposite directions in some examples.

At this point, it will be noticed that although a single gear tooth element 52 is shown, the input drive member 30 is shown in partial form for clarity. The movement of the input drive member 30 can be appreciated by the movement of the gear tooth element 52 relative to the outer gear ring 34 by comparing the position of the gear tooth element 52 with the gear section 44 with which it is engaged in FIGS. 6a-6c.

Notably, in FIG. 6a the output member 32 is in a rotational position at which the height of the cam shape is at a maximum. The cam shape provided by the output member 32 can therefore be considered as in a top dead centre position in FIG. 6a.

As the input member 30 is driven in a clockwise direction, a force will be exerted on the tip region 56 of the gear tooth element 52 by a rising flank 80 of the gear tooth section 44. This force is shown on FIG. 6a as F1. A component of force F1 will be in the vertically downwards direction (in the orientation of the drawings), and is shown here as F2. The gear tooth element 52 will therefore start to exert a force on the cam shaped surface of the output drive member 32 via the pivot pad 64 as the output member 32 rotates, and as the gear tooth element 52 passes the top position as shown in FIG. 6a.

Comparing FIG. 6b with FIG. 6a, it will be seen in FIG. 6b that the output member 32 has rotated in the clockwise direction by an angle ⊖ of about 30 degrees. Conversely, the gear tooth element 52 has only moved relative to the outer ring member 34 by a small fraction of a degree, which illustrates the speed increasing configuration of the transmission 28.

As can be seen, the cam shape of the output member 32 has changed position in FIG. 6b such that the vertical force F2 applied by the gear tooth element 52 via the pivot pad 64 now acts on a falling slope 82 of the cam shape. The gear tooth element 52, therefore contributes a rotational force to the output member 32, which combines with the forces generated by the other gear tooth elements to drive the output member 32 in rotation.

FIG. 6c is substantially the same as FIGS. 6a and 6b, although it shows the gear tooth element 52 a step further along its loading cycle. Once the gear tooth element 52 has gone through a load cycle, as shown, it is driven outwardly by the cam surface of the output member 32 and is not loaded during this movement.

Having described the general arrangement of the transmission 28, the discussion will now focus on various aspects associated with lubrication of the moving parts of the transmission 28.

The transmission of the invention is suitable for use in high load applications such as main gearboxes for wind turbines. Whereas lubrication for such sliding tooth design gearboxes is not so crucial for small-scale and low load applications, high torque applications as would be generated by wind turbine main shafts where torque levels are in the high kilonewton or meganewton scale, sufficient lubrication becomes critical for reliable operation of the transmission.

With this in mind, FIGS. 7 to 10 illustrate various features of the transmission 28 which relate to a lubrication system.

Figure 7:
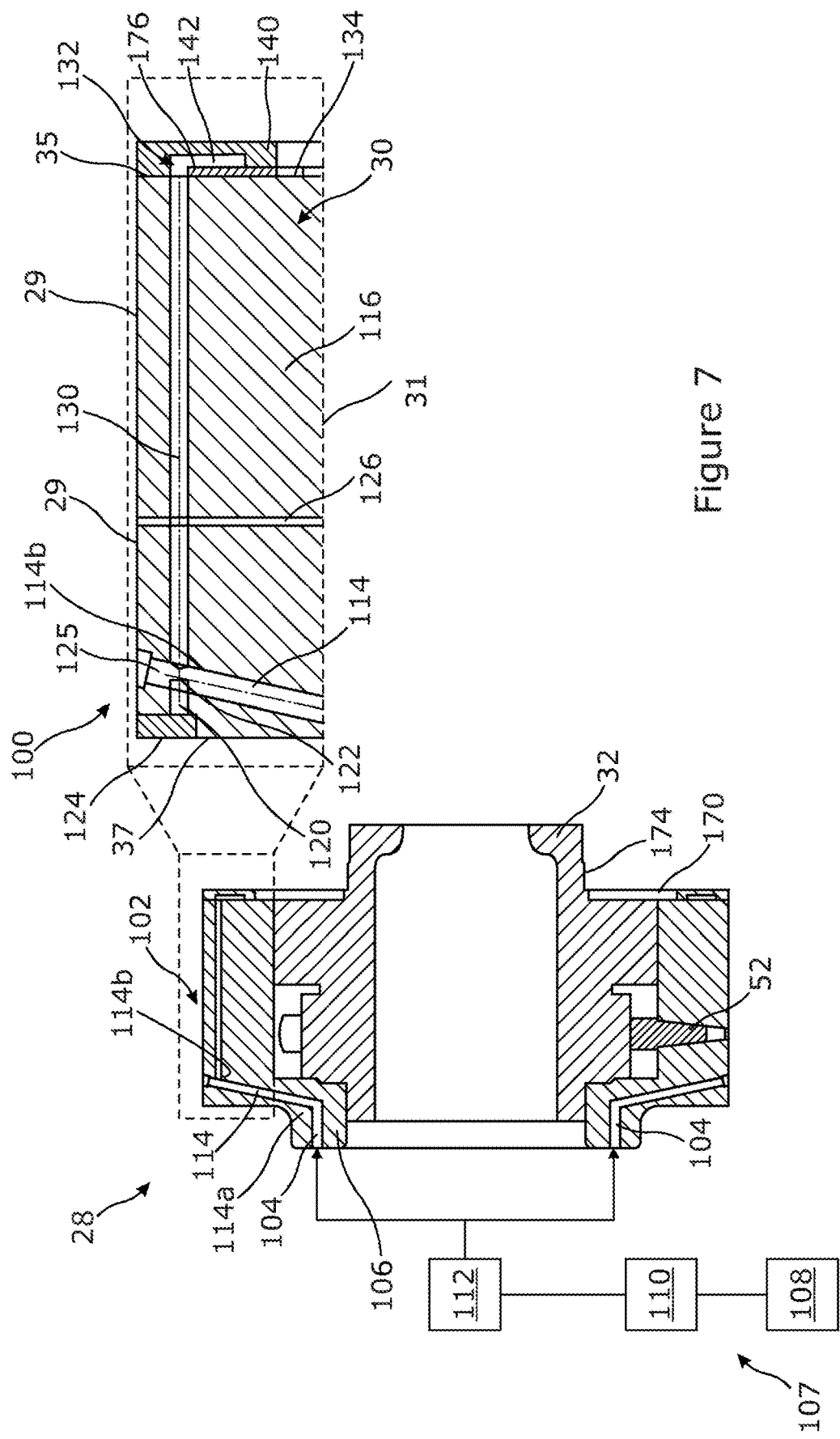
FIGS. 7 and 8 are section views through respective portions of the transmission showing the configuration of a lubrication system.
Figure 8:
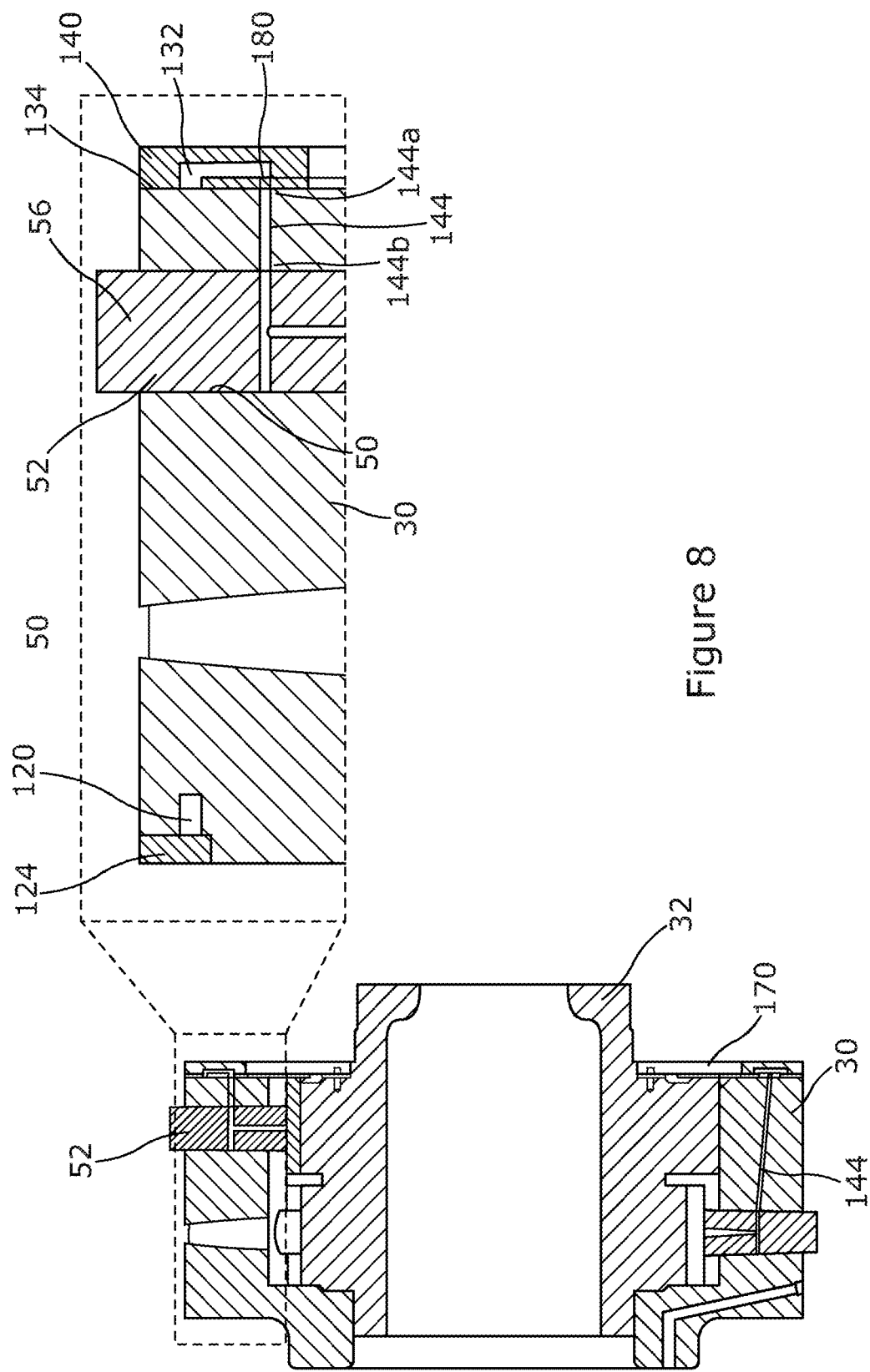

Referring firstly to FIGS. 7 and 8, it should be noted that these Figures show different sections through the transmission 28 taken along the rotational axis in different angular planes so that different detail of the transmission 28 can be appreciated more fully. The outer gear ring 34 has been omitted for clarity.

The transmission 28 comprises a lubrication system 100. That lubrication system 100 includes a network 102 of fluid passages, channels or pathways being configured to provide lubrication oil to various contacting surfaces of the transmission, for example between the radial outer surface of the output member 32 and the pivot pads 64, and between the radially outer surface of the input member 30 and the outer ring gear 34 (not shown), and to the tooth apertures 50.

The lubrication network 102 comprises fluid passages provided in the input member 30. As can be seen in FIG. 7, the lubrication network 102 includes one or more fluid inlets 104 defined in a hub portion 106 of the input member 30. Although two fluid inlets are shown in FIG. 7, more fluid inputs may be provided in the hub portion 106. Currently it is envisaged that four fluid inlets will be provided, those inlets preferable being spaced in an angularly equi-spaced relationship.

The fluid inlets 104 are supplied with lubrication fluid from a suitable fluid supply system 107. This may include a fluid reservoir or tank 108 and a fluid pump 110, and these are shown schematically in FIG. 7. A rotatable coupling 112 may be provided to transition the fluid supply from a stationary reference frame of the tank 108 and pump 110, to a rotational reference frame of the input member 30. Details of the rotatable coupling 112 are not the main focus of the invention so will not be described here for clarity. Moreover, it is considered within the ambit of a skilled person to configure a suitable rotatable coupling, which are known generally in the art.

With reference to the fluid inlets 104 that can be seen in FIG. 7, it will be appreciated that the fluid inlets 104 connect respectively to intermediate passages 114 that radiate generally radially outwards into an outer portion 116 of the input member 30. The outer portion 116 is positioned radially outwards of the hub portion 106. Here, the fluid inlets 104 are shows as extending in an axial direction through the input member 30 and, more specifically, through the hub portion 106. Axially-extending fluid inlets 104 provide a convenient means to connect the rotatable coupling 112 to the radially extending passages within the input member 30.

Each of the intermediate passages 114 has a proximal end 114a at the axially-extending inlet passage 104 and a distal end 114b that is connected to a first fluid distribution gallery or manifold 120. It should be noted that the fluid distribution gallery 120 extends circumferentially about the inlet member 30, and specifically in the outer portion 116 thereof. In this example, the fluid distribution gallery 120 is defined at least in part by a circumferential groove or channel 122 in an axial face of the input member and is closed off by a closure plate 124. The circumferential channel 122 extends circumferentially around at least a portion of the input member 30. This configuration provides a convenient means to form the fluid distribution gallery 120 in the input member 30.

The fluid distribution gallery 120 provides a volume from which lubrication fluid can be fed to multiple locations of the transmission. Some of these will now be described.

As can be seen in FIG. 7, a first feed passage 125 extends generally in a radial direction from the fluid distribution gallery 120 to the radially outer surface 29 of the input member 30. This may serve the purpose of providing lubrication oil to the contact between the outer gear ring 34 and the tips of the gear tooth elements 52. Additionally, the passage 125 enables the drilling of the passage 114. If the passage 125 is not required, it may be blocked with a suitable sealing plug, not shown.

A second feed passage 126 may extend from the fluid distribution gallery 120 or from a further passage, as shown here, to the radially inward surface 31 of the input member 30. The second feed passage 126 extends in a radial direction in this example. The second feed passage 126 is shown schematically in FIG. 7 to illustrate a possible path that the passage 126 may take through the input member 30, although it should be noted that other paths are possible. The second feed passage 126 allows lubrication oil to be fed to the outer circumference surface of the output member 32.

In addition to the first and second feed passages 125,126, the lubrication network 102 also includes passages to feed lubrication fluid directly to the gear tooth elements 52. More specifically, the passages feed lubrication fluid to the gear tooth apertures 50 within which the gear tooth elements 52 reciprocate. In this respect, a third feed passage 130 extends from the first fluid distribution gallery 120 to a second fluid distribution gallery 132 in a generally axial direction. The second fluid distribution gallery 132 is located on the opposite side of the input member 30 as the first fluid distribution gallery 120.

In this example of the invention, the second fluid distribution gallery 132 is also defined on an axially facing surface 134 of the input member 30 and, more specifically, the outer portion 116 of the input member 30. Here, the second fluid distribution gallery 132 extends circumferentially around the input member and so is circular in shape, when being viewed from an axial direction. In this example, the second fluid distribution gallery 132 is defined by a ring-shaped gallery plate 140 which is attached to the axial face 134 of the input member 30. The gallery plate 140 defines an annular channel 142. The annular channel 142 defines the volume for the second fluid distribution gallery 132 together with the adjacent axial surface 134 of the input member 30.

The gear tooth apertures 50 are fed with lubrication fluid from the second fluid distribution gallery 132 via respective fourth feed passages 144. As can be seen in FIG. 8, the fourth feed passages 144 extend from the second fluid distribution gallery 132. The fourth feed passages 144 have a first end 144a in communication with the second fluid distribution gallery 132 and a second end 144b in communication with a gear tooth aperture 50. By virtue of this configuration, lubrication fluid can be fed from the fluid inlets 104, to the first fluid gallery 120 via the intermediate passage 114, and from there to the second fluid distribution gallery 132 via the third feed passage 130. From the second fluid distribution gallery 132, fluid can be fed to the gear tooth apertures 50 via the fourth feed passage 144.

It should be noted that there may be a fourth feed passage 144 for each one of the respective gear tooth apertures 50. It should also be noted that the fourth feed passages 144 are provided to feed both rows of gear tooth apertures 50, as can be seen in FIG. 8.

In another example of the lubrication system shown in FIG. 7, the lubrication system being somewhat simpler and comprises similar parts, whose reiteration here is omitted for sake of brevity. The third feed passages 130 are directly used to feed the gear tooth apertures 50. These axial channels 130 are closed off by a further closure plate, which is placed on the axial face 134 of the input member 30. Therefore removing the need for the additional elements 132, 142, 144, 144a and 144b mostly shown in FIG. 8.

The lubrication system of FIGS. 7 and 8 compared to this variation offers the advantages of being easier to access in mounted state and being easier to manufacture, also flow control devices can be more easily replaced, to analyse any effect on oil distribution.

Optionally, the gear tooth elements 52 may be configured specifically to make most efficient use of the lubrication fluid that is delivered to the gear tooth apertures 50. The internal configuration/structure of a representative one of the gear tooth elements 52 can be seen in FIG. 8, and in more detail in FIG. 9.

It will be noted that the gear tooth element 52 shown in the illustrated examples includes external and internal channels and passages to transport lubrication fluid through the gear tooth element 52 and between different parts of the gear tooth element 52. More specifically, the illustrated gear tooth element 52 comprises a first lubrication port 150 at a first axial position, and a second lubrication port 152 at a second axial position. An internal lubrication passage 154 provides fluid communication between the first lubrication port 150 and the second lubrication port 152. In this way, lubrication fluid can be transported between the first lubrication port 150, to which fluid is delivered by the feed passage 144 that emerges in the wall of the gear tooth aperture 50, to the second lubrication port 152.

The second lubrication port 152 is in a lower position on the gear tooth element 52 as compared to the first lubrication port 150, which is nearer to the tip region 56.

The internal lubrication passage 154 can in principle be any shape but, in the illustrated example, is shown as being formed of an axial passage portion 156 and first and second radial passage portions 158,160. The radial passage portions 158,160 link the axial passage portion 156 to the first and second ports 150,152, respectively. Note that the terms 'radial' and 'axial' used in the context of the gear tooth element 52 in FIG. 9 are set in the context of the tooth axis B in FIG. 9.

To improve the distribution of lubrication fluid about the outside surface of the gear tooth element 52, one or both of the first and second lubrication ports 150,152 may be associated with a respective circumferential groove that extends around a portion of the gear tooth element 52. Preferably the grooves extend around the entire circumference of the gear tooth element. As can be seen in FIG. 9, a first circumferential groove 162 is positioned at the first lubrication port 150. A second circumferential groove 164 is positioned at the second lubrication port 152. Lubrication fluid in the grooves, therefore, serves to coat the outer surface of the gear tooth element 52 as it slides up and down in the gear tooth aperture 50. The grooves 162,164 also serve as a lubrication oil reservoir.

Figure 9:
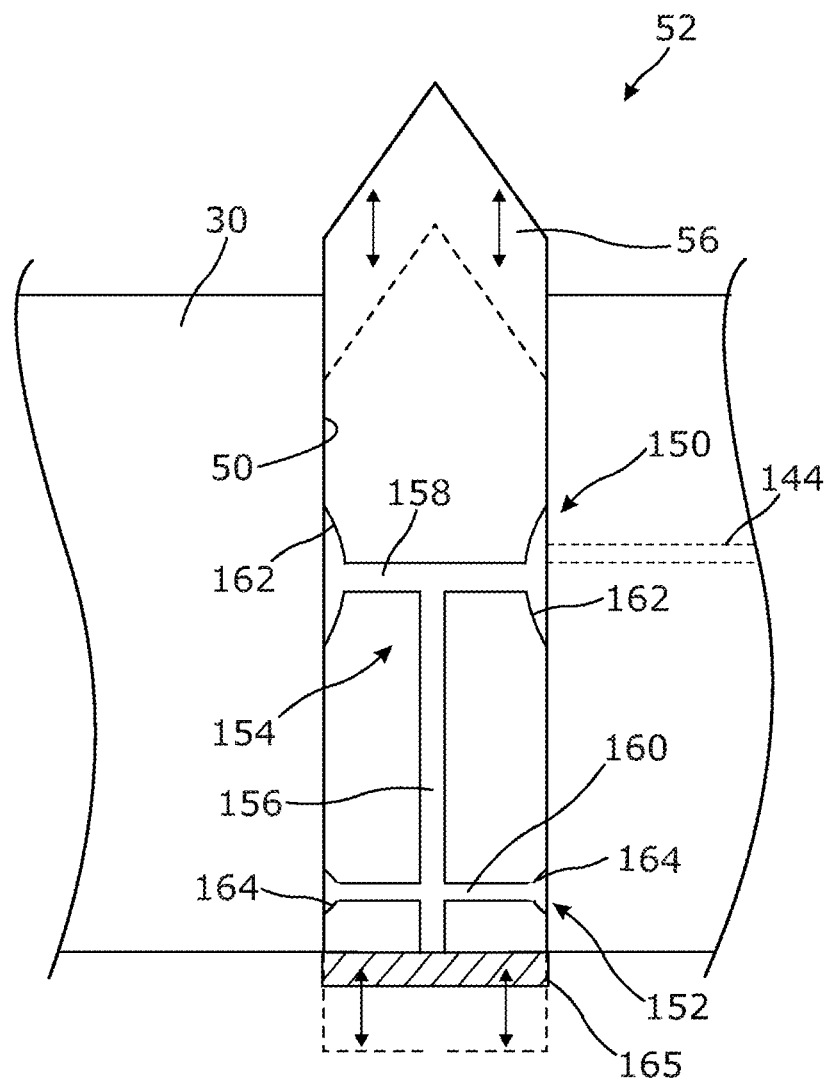
FIG. 9 is a schematic view of a gear tooth element of the transmission, which illustrates the role of the gear tooth element in the lubrication system.
Figure 10:
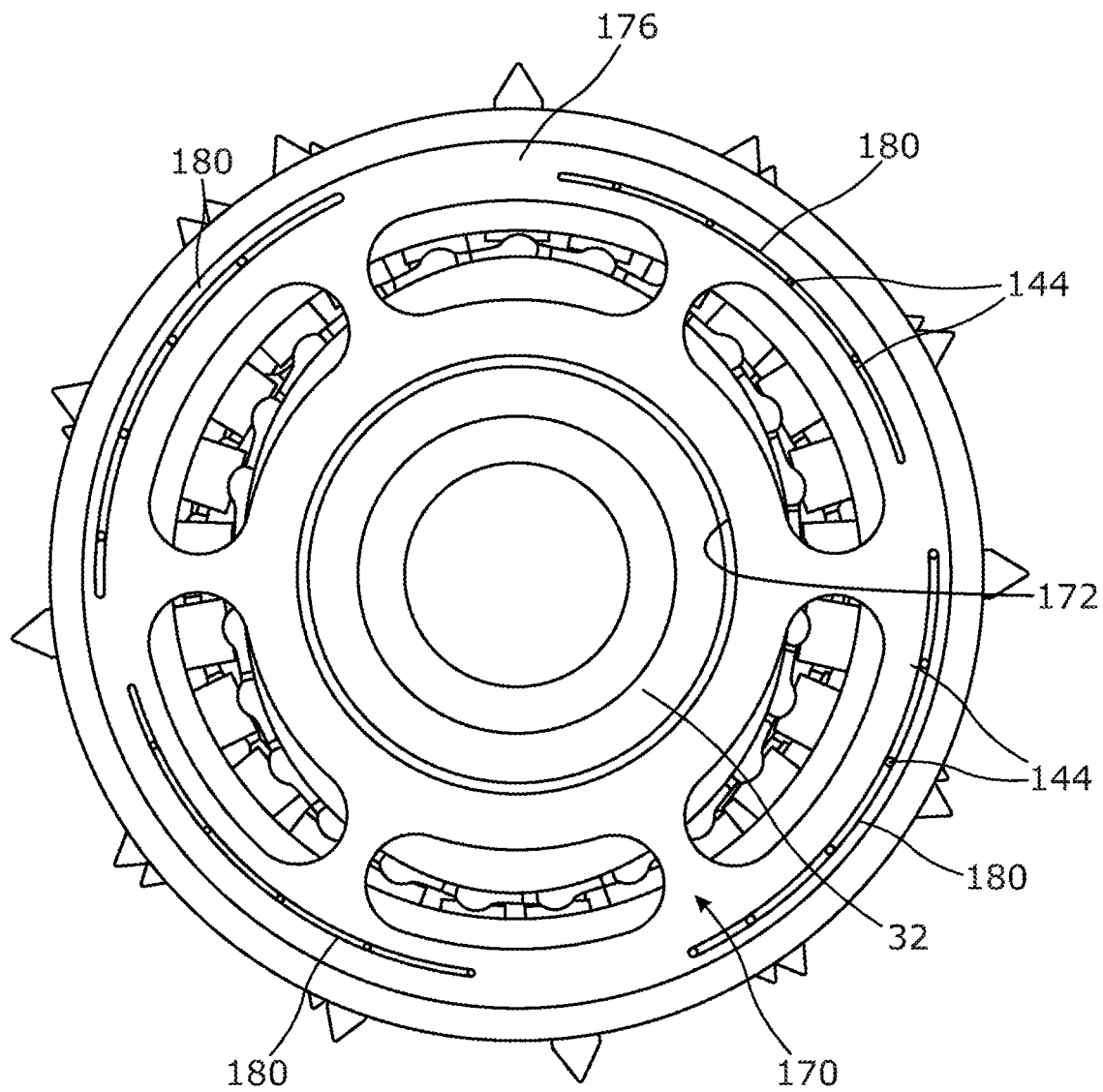
FIG. 10 is an end view of the transmission further illustrating a further aspect of the transmission.

It will be noted by examining FIG. 9 that the first lubrication groove 162 has a greater width, when considered along the axis B of the gear tooth element 52, compared with the axial width of the second lubrication groove 164. Without wishing to be bound by theory, it is currently believed that the lower part of the gear tooth element 52 experiences lower loading, and so the second lubrication groove 164 may be sufficient with a narrower width.

In other examples of the invention, the two lubrication grooves may be the same or nearly the same in width. The width of the upper groove 162 may be adjusted to control how much oil is admitted into the passages of the gear tooth element 52. A wider upper groove 162 would mean that the upper groove 162 overlaps the feed passage 144 for longer, during the sliding up and down movement of the tooth.

In the illustrated example, it will be noted that the internal lubrication passage 154 extends to the base of the gear tooth element 52. In this way, therefore, lubrication fluid can be provided to the interface between the pivot pad (not shown in FIG. 9) and the gear tooth element 52. In an alternative example, a closure element 165 can be affixed to the bottom of the gear tooth element 52 to close the internal passage 156. However, it should be noted that this is optional, and in some examples of the invention the passage 156 may be left open at the base of the tooth element 52.

The axial position of the second lubrication groove 164 is selected such that it remains within the tooth aperture 50 when the gear tooth element 52 is in its lowermost position, as can be seen by the dashed lines in FIG. 9. This ensures that lubrication oil supplied by the groove is applied most effectively to the aperture/bore 50.

Similarly, the axial position of the first lubrication groove 162 is selected so that it remains within the gear tooth aperture 50 through the reciprocating movement of the gear tooth element 52.

Preferably, all of the gear tooth elements 52 feature the lubrication passages as described above, although the invention extends to only a subset of the gear tooth elements being provided with such passages.

From the above discussion, it will be appreciated that the internal passages of the input member 30 and the gear tooth elements 52 enable lubrication fluid to reach important parts of the input member 30, which is particularly important for high load applications when lubrication is more crucial to increase the wear resilience of the transmission.

In some examples of the invention, the lubrication system 100 may be configured so that lubrication fluid is fed to the gear tooth apertures 50 by way of a constant flow. The flow may be variable in volume, but constant in the sense that there is always some flow to the gear tooth apertures 50. However, in another example, the lubrication system 100 may be configured such that the flow of lubrication fluid to the gear tooth apertures 50 is intermittent. In this way, the lubrication system may be configured so that lubricating fluid is delivered to a selected group of the gear tooth elements 52 only during a predetermined loading phase for those respective tooth elements. Conversely, when a gear tooth element is not in a loading phase, the delivery of lubrication fluid to that gear tooth element can be stopped or interrupted or minimised. This is a benefit since it means that a lower volume of lubrication fluid is being circulated through the system at any one time. This makes the system more efficient, or can reduce the demands on the feed pump such that downsizing is possible. Furthermore, this measure can avoid overloading various parts of the structure with lubrication fluid.

In one example, in order to achieve this functionality the flow of lubrication fluid may be controlled by an electronically-operated flow control valve arrangement, which is not illustrated in the Figures. In such an arrangement, each of the fourth feed passages 144, or a group of such passages, may be connected to an electronically-operated flow control valve. Such a control valve may be configured to open fluid flow through a respective fourth feed passage, or group of passages to ensure that lubrication fluid is fed to the loaded teeth and to relieve fluid flow to the unloaded teeth.

In other examples, this advantage may be achieved without electronically-controlled flow control valves which would otherwise introduce complexity into the system. One such solution will now be described with reference to FIGS. 7, 8 and 10, which show the use of a flow control device 170, which can also be considered to be a valve arrangement.

Here, the flow control device 170 takes the form of a disc or plate. The flow control device 170 is circular in shape and has a central aperture 172 which is received over the output member 32 and is attached to a radial shoulder 174 thereof. The means of coupling of the flow control device 170 to the output member 32 is not shown in the Figures, but this may be achieved by a suitable configuration of mechanical fasteners such as bolts.

The position of the attachment point of the flow control device 170 to the output member 32 is such that the plane of the flow control device 170 abuts the axially facing surface 134 of the input member 30. In this way, a radially outer rim region 176 of the flow control device 170 overlaps the fourth feed passages 144.

As can be seen particularly well in the inset panels in FIGS. 7 and 8, the radially outer rim region 176 of the flow control device 170 extends beneath the gallery plate 140. A suitable sealing means (not shown) may be provided at the contacting surfaces between the gallery plate 140 and the flow control device 170.

The flow control device 170 is provided with apertures 180 which selectively uncover certain ones of the fourth fluid passages 144 that lead to the gear tooth apertures 50. The apertures 180 can be seen in FIG. 10 clearly in the form of arcuate slots. Here, four arcuate slots are provided, each of which uncovers approximately five fluid passages 144, which can be seen through the slots, only some of which are labelled for clarity. It should be appreciated here that the gallery plate 140 is not shown in FIG. 10 so as not to obscure the detail of the apertures 180.

The purpose of the flow control apertures 180 is to enable fluid to flow from the second fluid distribution gallery 132 through the apertures 180 and into the respective fourth fluid passages 144 that lead to the gear tooth apertures 50 In this way, as the fluid control device 170 rotates in synchronisation with the output member 32, the slots 180 permit lubrication fluid to flow only to selected ones of the gear teeth elements 52, that is, those that are experiencing a loading phase. The flow control apertures 180 therefore can be considered to progressively uncover a set of passages, while covering up another set of the passages, during rotation of the flow control device 170.

Many modifications may be made to the specific examples described above without departing from the scope of the invention as defined in the accompanying claims. Features of one embodiment may also be used in other embodiments, either as an addition to such embodiment or as a replacement thereof.

In the above discussion, the speed increasing transmission has been described as used in a wind turbine powertrain as a means of increasing the rotational speed of the main shaft to a speed suitable for an input shaft of an electrical generator.

Figure 11:
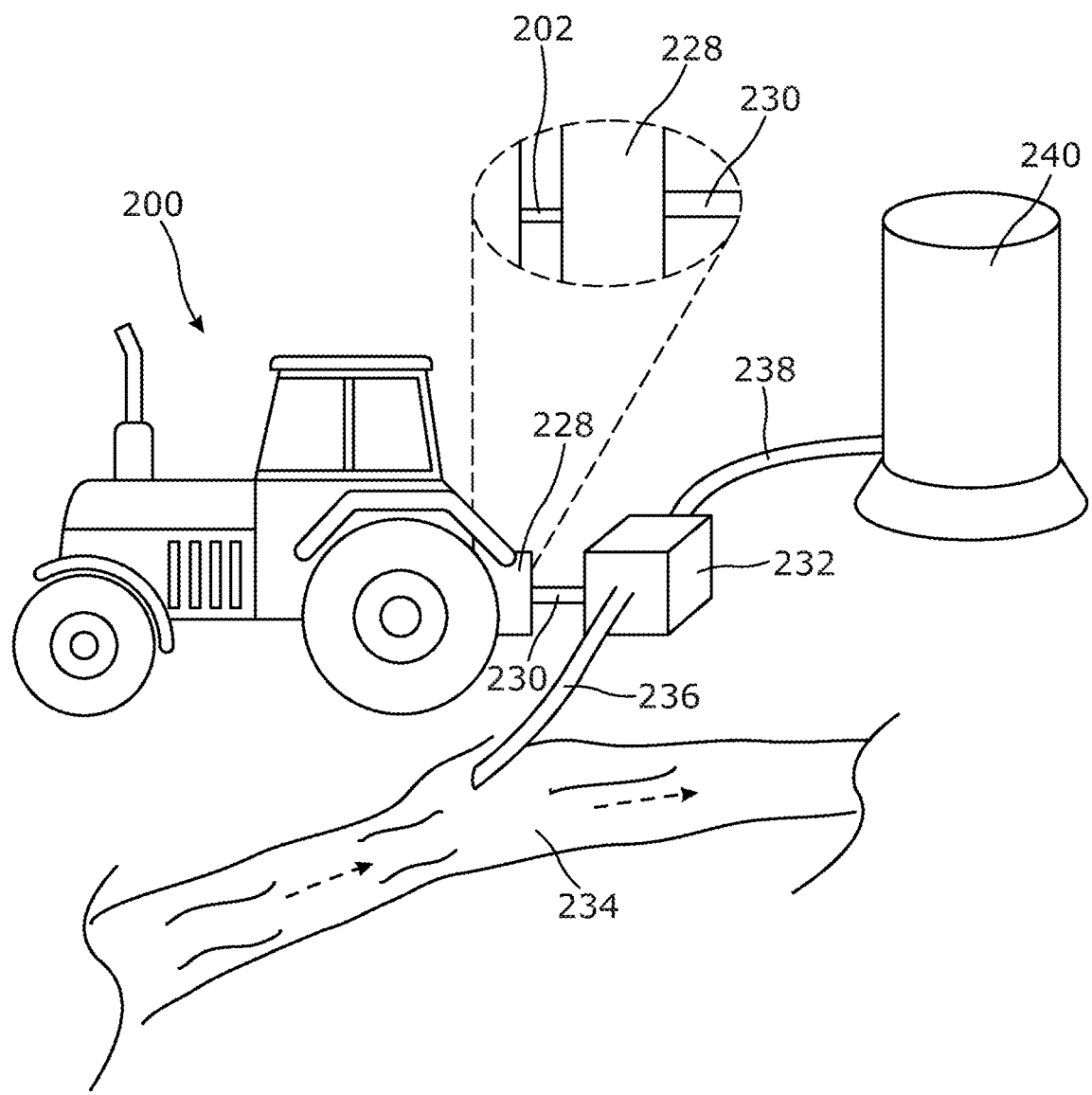
FIGS. 11 and 12 are views of further applications for a transmission according to the invention.
Figure 12:
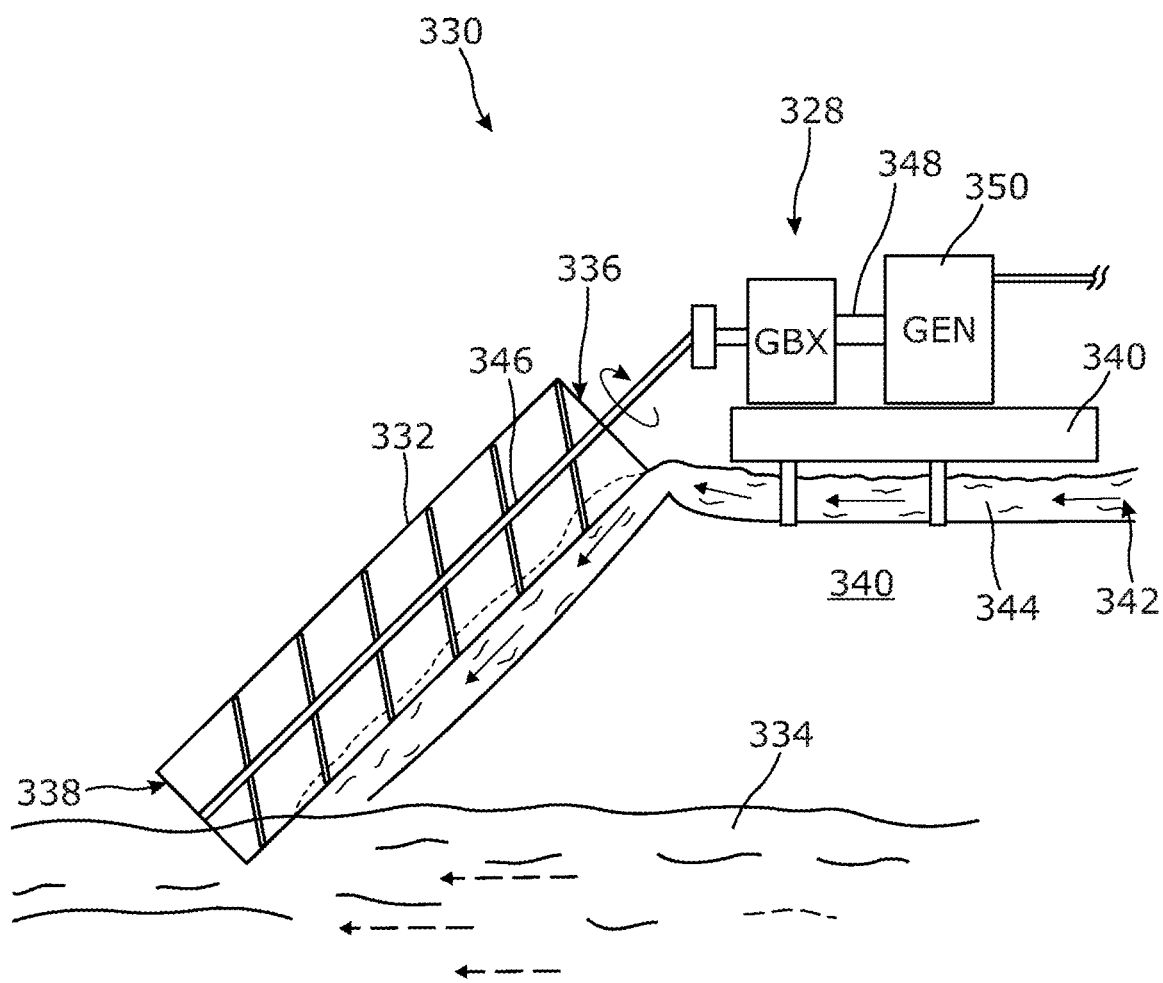

The skilled person would understand that this is not the only application for such a transmission. FIGS. 11 and 12 illustrate two further applications, by way of example, within which the transmission may be used. In the following discussion, the internal details and functionality of the transmission can be assumed to be the same as described above.

With reference firstly to FIG. 11, the transmission of the invention may be used in agricultural gearbox applications. For example, here an agricultural machine such as a tractor 200 provides a power take off coupling 202, which is a rotating shaft that is driven by the engine of the tractor 200, as is known in the art. The power takeoff coupling 202 may typically be driven at between 200 and 600 rpm, and is dependent on engine speed. For some agricultural applications, that rotational speed may be sufficient. However, for other applications a higher rotational speed may be required. Therefore, in FIG. 11 a transmission 228 according to the invention is provided that receives as a drive input the power take off coupling 202 from the tractor 200. Here, the transmission 228 is shown attached to the tractor 200, but this is not essential, particularly if mobility is not required. The transmission 228 converts the relatively high torque and low speed drive input from the power take off coupling 202 to a higher speed but lower torque drive input 230 to a hydraulic pump 232. As an example, the rated running speed of the pump may be between 1200 and 2000 rpm. The hydraulic pump 232 may be a gear pump or any other suitable form of pump. In the illustrated application, the pump 232 is used to draw water from a nearby stream 234 through an input pipe 236 and pump the water through an outlet pipe 238 to a water storage container 240.

Beneficially, the technical advantages of the transmission of the invention such as low backlash and smooth operation minimises further vibration on the power take off coupling 202 and reduces operational noise for the operator of the machinery.

A further application is shown in FIG. 12 in which a transmission 328 according to the invention is integrated into a hydrodynamic power generation system 330.

The generation system 330 includes a so-called Archimedes screw device 332 arranged at an inclined angle with respect to a flowing body of water such as a river or stream 334. An inlet 336 of the screw device 332 is arranged at an upper end, and a discharge or outlet 338 is arranged at the lower end thereof. The general form of screw device is conventional.

A suitable structure 340 is provided to create a feed channel 342 through which is fed a flow of water 344 to the inlet 336 of the screw device 332 which causes it to turn, as is well known. The structure 340 may be an earth or concrete bank, for example, but other structures are possible.

The screw device 332 comprises a drive shaft 346 which supports the screw device 332 on suitable bearings (not shown) and which provides an output drive. The drive shaft 346 is connected to the gearbox or transmission 328 in accordance with the invention. Since the screw device 332 only has a low rate of rotation, for example 0.2 to 1 Hz, the transmission 328 provides a speed increasing function. As such, the transmission 328 includes an output drive shaft 348 which is coupled to an electrical generator 350.

It will be appreciated that the compact arrangement of the transmission according to the invention, and other advantageous characteristics such as low noise and low backlash, make it beneficial for such applications where installation space is at a premium. In addition, the low backlash and smooth operations reduces wear on the other components included in the powertrain.

In the examples of the invention discussed above and shown in the accompanying Figures, the transmission has been described as a speed increasing transmission wherein the input member 30 receives rotational drive from the main shaft of the wind turbine at a relatively low speed, and the output member 32 provides a higher rotational output speed to the generator 26. Although this is the application currently envisaged for the transmission, which will be technically advantageous for applications outside wind turbines, as is evidenced by FIGS. 11 and 12, it should be noted here that the transmission of the invention could also be 'back driven', meaning that it could be used as a speed reducer transmission. In such a situation, therefore, the radially inner output member 32 as described above may receive rotational drive from a prime mover, e.g. such as an internal combustion engine or electric motor, having a relatively high rotational speed and relatively low torque, whereas the radially outer input member 30 as described above would then provide the onwards drive to a load, for example a vehicle drive train or hoisting system, having a lower output speed but higher torque. In this context, therefore, the input member 30 of the transmission may be considered more generically as a first drive member whereas the output member 32 may be considered more generically as a second drive member. In either mode of operation, i.e. when operated as a speed increasing transmission or a speed reducing transmission, it is the case that rotational driven movement of the input member 30 causes radial movement of the tooth elements 52. In contrast, when the output member 32 is driven, it is the rotation of the output member 32 that causes radial movement of the tooth elements 52 which, in turn, means that the input member 30 also rotates. However, in this operational mode, the transmission may also be back-driven meaning that the rotational movement of the input member 30 causes radial movement of the tooth elements. Therefore, it can be considered that rotational movement of the input member 30 is associated with, or linked to, radial movement of the tooth elements 52.

This invention is most preferred in mainly one-direction applications, which will often be high torque applications, for example the wind turbine applications discussed above. However, the present invention may also find use in other areas where it is desired to have high power density, high torque density, large hollow shaft ratio, advantageous damping behaviour, high rigidity, zero or reduced play or backlash, high synchronization, or in general a compact design. Even for two-direction applications, such as robotics, machine tools, industrial drive-trains, servo-motor-torque-speed-downs, packaging machines and milling machines the present invention will also be an improvement over the known prior art.

In the above discussion, the transmission comprises a lubrication system that feeds lubrication fluid to specific locations and components within the transmission as this tends to be an efficient way to achieve sufficient lubricity whilst reducing fluid requirement. Since lubrication fluid is delivered to the points of need, the lubrication system of the invention can be considered to be a "dry sump" system which does not have a fluid collector/sump/bath within which lubrication fluid can collect and through which components of the transmission may pass, or in which components may at least partly be immersed, in order to aid lubrication. However, it is envisaged that in some examples of the invention the transmission may further be configured to include a sump or oil bath. This can serve as a fluid collector for lubrication fluid to be fed back to the main fluid tank, and/or it can also be configured such that various components can be exposed to the fluid in the sump during rotation, for example the input/output members and the tooth elements.

In the examples of the invention discussed above, various features of tooth elements have been described and shown. In general, the tooth elements comprise a cylindrical tooth body which transitions to a tapered tooth tip or head region which terminates at a tip or point. The tooth body in the illustrated examples are cylindrical and match the tooth apertures/guides so they can slide relative thereto. Although the tooth elements and apertures/guides are shown as having a circular cross section, other cross sections are acceptable in principle.

Figure 13:
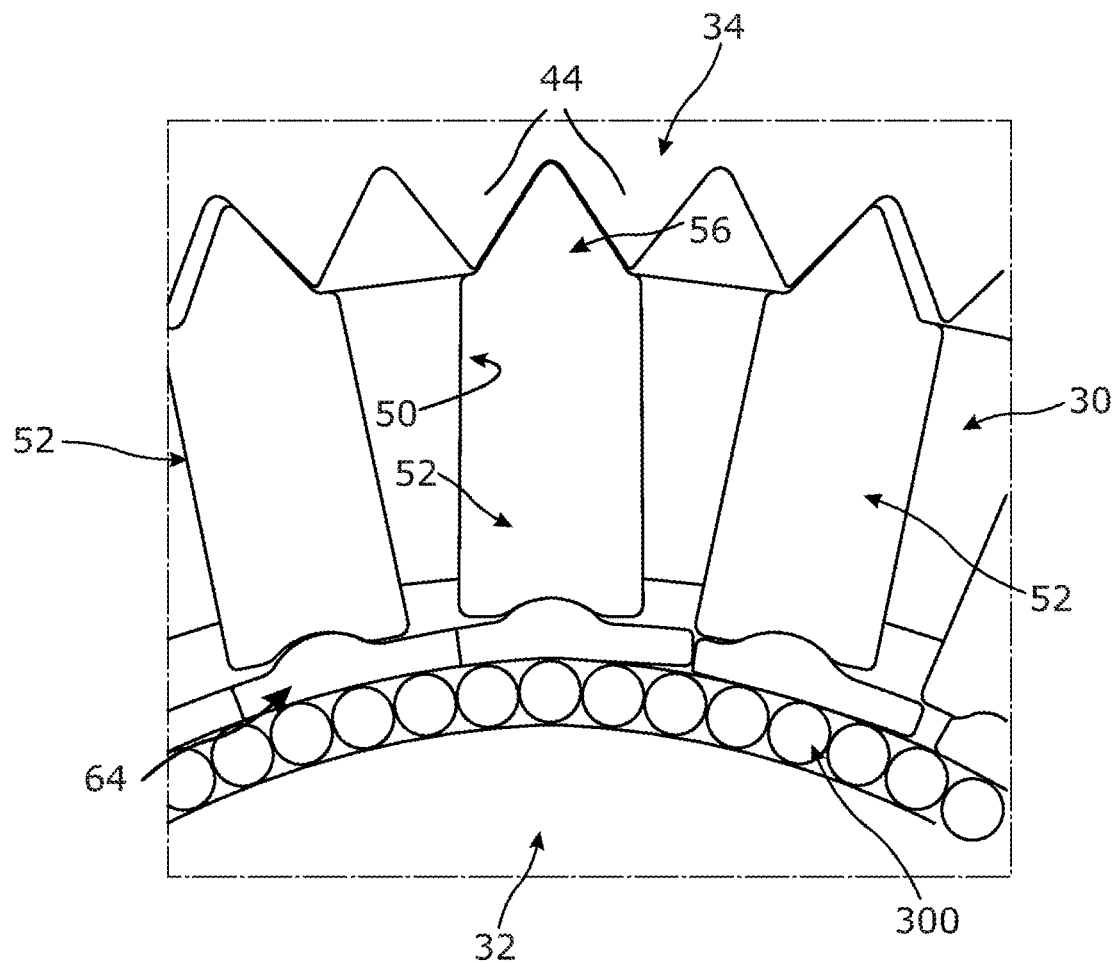
FIG. 13 and FIGS. 14a, 14b show an alternative configuration of gear tooth element for use with a transmission in accordance with the invention.
Figures 14A, 14B:
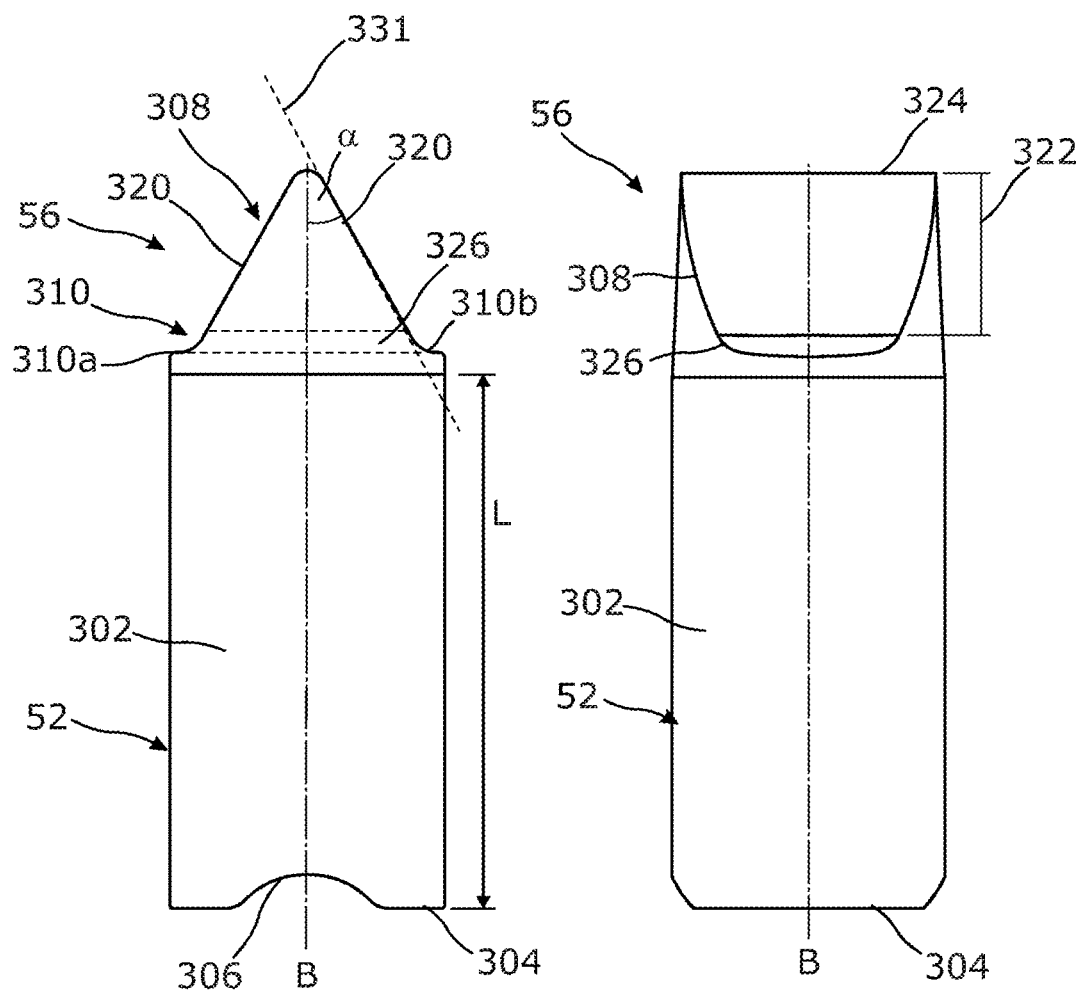

Another form of tooth element is shown in FIG. 13 and FIGS. 14a and 14b. The same reference numerals will be used in these Figures to refer to features in common and/or equivalent with the previously illustrated examples.

In FIG. 13, three tooth elements 52 are shown in their respective input member 30. The outer gear ring 34 is also shown in part, as is the output member 32, together with the pivot pads 64 and a bearing layer 300 that is intermediate the outer surface of the output member 32 and the pivot pads 64. It will be appreciated that the tooth member 52 shown in the centre of the image is in a 'top dead centre' position relative to its respective gear tooth section 44, whereas the other tooth elements 52 are in in slightly laterally shifted positions.

With reference also to FIGS. 14a and 14b, it will be apparent that the tip region 56 is shaped differently to the previous examples.

The tooth element 52 comprises a tooth body 302 having a tooth base 304 which is configured for engagement with an adjacent pivot pad 64 (not shown in FIG. 14a/b) by virtue of a recess 306 defined therein.

The tooth tip region 56 is adjacent the tooth body 302 distal from the tooth base 304. The tooth tip region 56 is defined by a flank section 308 that is demarked from the tooth body 302 by a shoulder 310. As seen in FIG. 14a, there is provided a left shoulder 310a and a right shoulder 310b.

The shoulders 310 are intermediate the top of the tooth body 302 and the flank section 308 of the tip region 56. The shoulders 310 and flank section 308 together form the tooth tip region 56 of the tooth element 52.

Over a body length L along the longitudinal axis B of the tooth element 52, the tooth body 302 has a substantially constant cross-section, which is circular in this example, although this need not be the case and other cross sectional profiles are acceptable. Where the cross section is not circular, that cross section profile may be substantially constant along the longitudinal length of the tooth body 302. The tooth body 302 is in contact with the tooth aperture 50 or "guide" of the input member 30 over the length of the tooth body 302 and so forces can be transmitted between the tooth element 52 and the respective aperture via the contact surfaces, contact lines or contact points.

The flank section 308 comprises tooth flanks 320, which can engage with the corresponding surfaces of the gear tooth sections 44 on the outer gear ring 34.

FIG. 14b shows the tooth element 52 when viewed perpendicularly from a tooth flank 320. It will be apparent that the tooth flank 320 is a predominantly flat surface that extends from the tip[ of the tooth towards the tooth body 302, and particularly the shoulder 312.

The tooth flanks 320 comprise a straight substantially planar section, labelled as 322, and first/second transition sections 324, 326. The substantially planar section 322 may have some curvature, although it is shown as planar in the figures. The first transition section 324 is located towards the tip end of the flank 320 and extends towards the tip to provide a somewhat rounded end rather than a sharp tip shape, thereby reducing stress concentrations. The second transition section 326 is located at the other end of the flank 320 and merges into the shoulder 310.

The flanks 320 define an angle with respect to the tooth axis B. As shown, the angle α of each flank is around 20 degrees, although this is just exemplary and other angles would be acceptable. As a result, the cone angle of the tooth tip is approximately 40 degrees. Currently it is envisaged that cone angles between 30 and 60 degrees would be acceptable, by way of non-limiting example.

The presence of the shoulders 310 mean that a step is formed between the upper end of the tooth body 302 and the flanks 320. As such, a flank line 331 corresponding to a medial tangent to the tooth flank 320 as seen in FIG. 14a intersects a volume of the tooth body 302.

The shoulder 310 provides a curved, rounded or concave transition between the top of the tooth body 302 and the angled flank 320. As can be seen, the axially lower end of the shoulder 312 is horizontal, from which point the shoulder 310 curves upwardly through the lower transition section 326 to blend into the flank 320. The curvature of the transition section 326 may be radiussed. The shoulder 312 and transition section 326 may be machined more finely than the tooth flank 320.

An advantage of the provision of the shoulders 310 with respect to the tooth flanks 320 may be that splash losses in the contact of the tooth element with the gear profile may be reduced. The surface area of the tooth flank may in particular be reduced by the shoulders 310, whereby lubricating oil needs to be displaced from a smaller surface.

The tooth elements of the invention may be any suitable material, but currently it is envisaged that a suitable grade of stainless steel is most appropriate in high load applications. However, in other applications materials other than steel may be appropriate such as plastics. Similar considerations apply for the material of the outer ring gear, the input member and the output member. At least a part of the tooth element is configured to be flexurally rigid. The term "flexurally rigid" should in this case be typically understood technically to mean that bending deformations of the teeth are so small due to the rigidity of the material of the teeth that they are at least substantially unimportant for the kinematics of the gearing. Flexurally rigid teeth comprise in particular teeth made of a metal alloy, in particular steel, or a titanium alloy, a nickel alloy or any other alloys. Furthermore, flexurally rigid teeth of plastics may also be provided, in particular in transmissions in which the outer gear ring and the input/output member are also made of plastics. Metal/alloy components offer the advantage that they are extremely torsionally rigid and withstand high loads. Gearings of plastics offer the advantage that they have a low weight. The term "flexurally rigid" means in particular a flexural rigidity about a transverse axis of the tooth. This means in particular, that when the tooth is viewed as a rod from a tooth base to a tooth flank area, a flexural rigidity is given at least substantially excluding bending deformations between the tooth flank area and the tooth base. Due to the flexural rigidity, a very high resistance to load and torsional rigidity of the gearing are achieved.

The invention claimed is:

1. A transmission comprising:
   a fixed gear ring;
   a first drive member rotationally supported within the fixed gear ring, the first drive member defining a plurality of radially arranged apertures each of which accommodates a tooth element, each tooth element having a tooth tip region and a tooth base, the first drive member comprising a radially outer face and a radially inner face, and wherein the tooth tips of the tooth elements engage a corresponding gear profile defined by the fixed gear ring,
   a second drive member which is rotationally supported such that it extends within the first drive member, the second drive member defining a cam profile which engages each of the plurality of tooth elements,
   wherein the first drive member comprises a lubrication system configured to feed lubrication fluid to at least one of i) the radially arranged apertures, ii) the radially outer face of the first drive member and iii) the radially inner face of the first drive member.

2. The transmission of claim 1, wherein the lubrication system comprises at least one channel extending through the first drive member.

3. The transmission of claim 1, wherein the first drive member is an input member and the second drive member is an output member, wherein the output member is acted on and driven by the tooth base of each of the plurality of tooth elements thereby to cause rotation of the output member.

4. The transmission of claim 1, further comprising a rotational fluid coupling to interface between a hydraulic supply in a stationary reference frame, and the lubrication network in a rotational reference frame.

5. The transmission of claim 4, wherein the rotational fluid coupling connects to at least one axially extending fluid inlet defined in the first drive member.

6. The transmission of claim 1, wherein the lubrication system includes a fluid distribution gallery that extends about at least a portion of the first drive member.

7. The transmission of claim 6, wherein the fluid distribution gallery is defined at least in part by a channel defined in an axial facing surface of the first drive member.

8. The transmission of claim 1, wherein the lubrication system includes one or more generally axial passages leading to respective ones of the radially arranged apertures.

9. The transmission of claim 8, further comprising a rotational fluid coupling to interface between a hydraulic supply in a stationary reference frame, and the lubrication network in a rotational reference frame, wherein the rotational fluid coupling connects to at least one axially extending fluid inlet defined in the first drive member, and wherein the one or more generally axial passages span between the respective radially arranged apertures and the fluid distribution gallery.

10. The transmission of claim 1, wherein the lubrication system includes one or more first generally radial passages which lead to the radially outer face of the first drive member.

11. The transmission of claim 10, wherein the lubrication system includes a fluid distribution gallery that extends about at least a portion of the first drive member, and wherein the first generally radial passages extend from the fluid distribution gallery.

12. The transmission of claim 1, wherein the lubrication system includes one or more generally radial second passages that lead to the radially inner face of the first drive member.

13. The transmission of claim 12, wherein the lubrication system includes a fluid distribution gallery that extends about at least a portion of the first drive member, and wherein the generally radial second passages extend from the fluid distribution gallery.

14. The transmission of claim 13, wherein the generally radial second passages extend radially inwards to a hub portion of the first drive member.

15. A wind turbine including a tower on which is mounted a nacelle that supports a rotatable hub, wherein the rotatable hub is coupled to a transmission in accordance with claim 1.

* * * * *